United States Patent
Kawabe

(10) Patent No.: US 7,729,078 B2
(45) Date of Patent: Jun. 1, 2010

(54) INFORMATION STORAGE DEVICE

(75) Inventor: Takayuki Kawabe, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/328,524

(22) Filed: Dec. 4, 2008

(65) Prior Publication Data
US 2009/0231749 A1 Sep. 17, 2009

(30) Foreign Application Priority Data
Mar. 17, 2008 (JP) ............................. 2008-068167

(51) Int. Cl.
*G11B 15/18* (2006.01)
(52) U.S. Cl. ....................................................... 360/71
(58) Field of Classification Search ........................ None
See application file for complete search history.

(56) References Cited

U.S. PATENT DOCUMENTS
6,674,589 B2 * 1/2004 Min et al. ..................... 360/31

FOREIGN PATENT DOCUMENTS
JP  A 2006-31846  2/2006

* cited by examiner

*Primary Examiner*—K. Wong
(74) *Attorney, Agent, or Firm*—Greer, Burns & Crain, Ltd.

(57) ABSTRACT

A drive section which moves a head above an information storage medium and a control section are provided, and each track on the information storage medium is made up of alternating first regions for writing in and reading out user information and second regions that store information for the positioning of the head. The control section is provided with a feedback control value determining section for eliminating the difference between the head position and the representative position of the first region, which is an access object, a performing control value determining section for determining the performing control value for the performing control by finding the logical control value associated with the first region where the feedback control value is determined and adding the feedback control value to this logical control value and a performing control section for actually controlling the drive section.

12 Claims, 18 Drawing Sheets

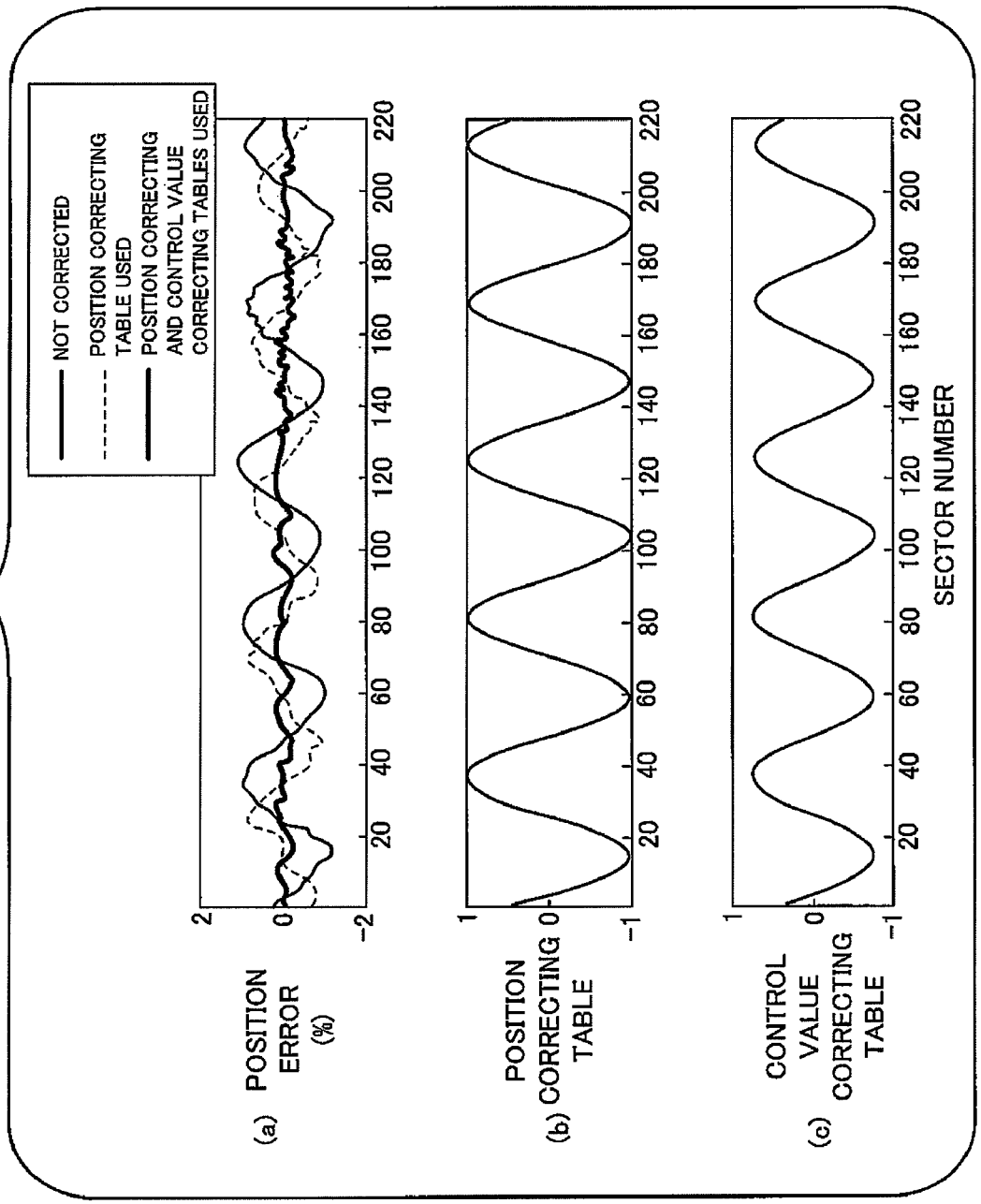

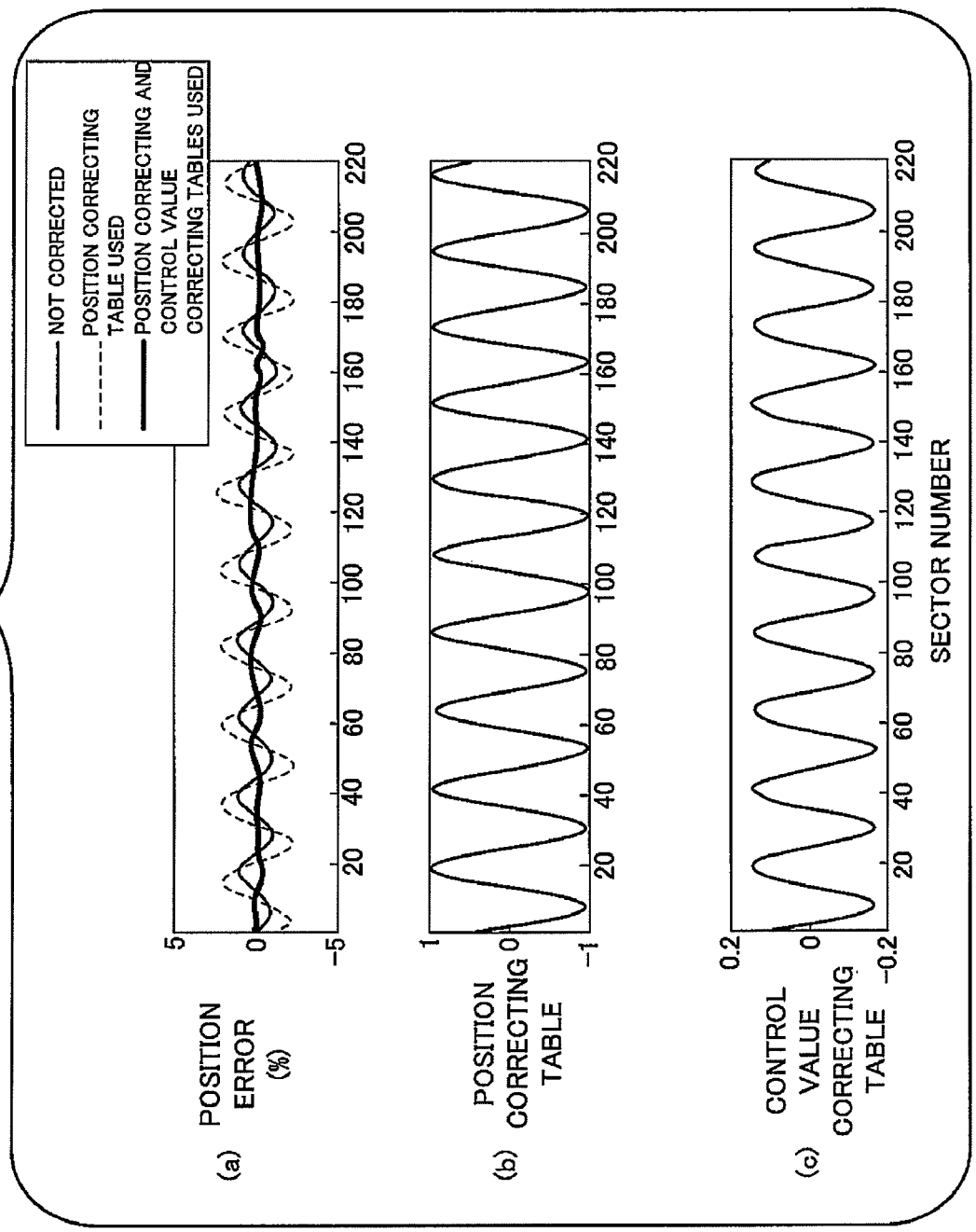

INFORMATION STORAGE DEVICE

CROSS-REFERENCE TO RELATED APPLICATION(S)

This application is based upon and claims the benefit of priority of the prior Japanese Laid-open Patent No. 2008-068167, filed on Mar. 17, 2008, the entire contents of which are incorporated herein by reference.

FIELD

The embodiments discussed herein relate to an information storage device which rotates an information medium in disc form in which information is stored and moves a head above the rotating information storage medium in order to access information.

BACKGROUND

In recent years, techniques relating to apparatuses built into computers and peripheral apparatuses connected to computers from the outside have been developing rapidly, in accordance with the development of computer technique. One such technique relates to information storage devices having a flat information storage medium, such as a magnetic disc, which store information by writing in information in the information storage medium.

Some information storage devices record information in an information storage medium and reproduce (access) information from the storage medium by moving a head which functions to record and reproduce information over the information storage medium while the latter is rotated. A hard disc device (HDD) is a typical example of such an information storage device. In most information storage devices in which a head accesses an information storage medium, a number of data regions for writing in and reading out user information (hereinafter simply referred to as "data") handled by the user and a number of servo regions for storing information for positioning the head (hereinafter simply referred to as "position information") are formed as different regions on the information storage medium in the device, so that the respective data regions can be identified by means of the position information stored in the servo regions. When the head reads out position information from the servo regions, the control section, which controls the head, identifies the position of the head over the storing medium, so that the head can be positioned above a desired data region. Thus, information storing media where data regions and servo regions are regularly aligned according to a predetermined positional relationship are ideal information storing media for positioning the head.

Here, servo regions and data regions are described more specifically citing a magnetic disc built into a hard disc device (HDD).

FIG. 1 is a diagram illustrating an ideal magnetic disc 1000, where data regions and servo regions are regularly aligned according to a predetermined positional relationship.

As illustrated in this figure, data regions 1002 in stripe-shaped, each of which is provided between two servo regions 1001, extend straight in the direction of the circumference of the magnetic disc 1000 (horizontal direction in figure). The head moves the right in the figure relative to the magnetic disc 1000 when the magnetic disc 1000 rotates (that is, the magnetic disc 1000 moves to the left when rotating), and records/reproduces (accesses) information in the magnetic disc 1000 while moving. Here, pairs of servo regions 1001 and data regions 1002 to the right are referred to as sectors, and sectors aligned in the direction of the circumference of the magnetic disc 1000 and running around the center of the disc form tracks 1005. The respective servo regions 1001 store information on the position on the magnetic disc 1000 for each servo region 1001, and this information identifies the position of the head (specifically, the position of the reproducing element or recording element in the head for accessing information), namely, at which track the head is, at which sector, or how far from the center position of the servo regions 1001 in the direction of the radius of the magnetic disc 1000. Data regions 1002 and servo regions 1001 are provided with magnetic regions formed of a magnetic material, and data information and position information are recorded in a form of magnetization direction of magnetization formed in the magnetic regions of the data regions 1002 and the servo regions 1001. Here, nonmagnetic regions 1003 formed of a nonmagnetic material (material having extremely low susceptibility) are provided in the top and bottom side of the data regions 1002 in the figure, and thus, the data regions 1002 are discretely aligned in the direction of the radius of the magnetic disc 1000 (vertical direction in figure) with servo regions 1001 in between, so that the data regions can be clearly distinguished in the direction of the radius of the magnetic disc 1000 when the head stores/reproduces (accesses) information. Here, the servo regions 1001 are illustrated as being aligned in the vertical direction, and perpendicular to the direction in which the tracks extends (horizontal direction in figure) in the figure. This is because only a part of the configuration of the magnetic disc 1000 is illustrated, and the servo regions 1001 are actually aligned slightly diagonally relative to the direction in which the tracks extend (horizontal direction in figure) when the magnetic disc is viewed in its entirety (see FIG. 7 below) This is the same in the following FIGS. 2 and 3.

In the work of forming the regions in the magnetic disc 1000 as illustrated in FIG. 1, first a number of annular regions to be the basic form of tracks and run around the center of the disc are formed in the direction of the radius of the magnetic disc with nonmagnetic regions in stripe-shaped which run around the center of the disc in between. Next, a number of line regions are formed so as to extend in lines from the center of the magnetic disc toward the edge of the magnetic disc and divide the annular regions. Here, annular regions sandwiched between two line regions become the data regions 1002 in FIG. 1. Each line region is divided into unit storage regions for storing position information indicating the position on the magnetic disc, and position information is recorded in each unit storage region. The unit storage regions, where position information is recorded, are the servo regions 1001 illustrated in FIG. 1.

As described above, in ideal magnetic discs 1000, data regions 1002 in stripe-shaped extend straight in the direction of the circumference of the magnetic disc 1000 (horizontal direction in figure). In addition, in ideal magnetic discs 1000, the centers of the servo regions 1001 adjacent to respective data regions 1002 aligned in the horizontal direction in the figure are in the same position relative to the direction of the radius of the magnetic disc 1000 (vertical direction in figure), and furthermore, are in the same position as the center of respective adjacent data regions 1002 relative to vertical direction in the figure. The center positions $S_1$, $S_2$, $S_3$, $S_4$, $S_5$, $S_6$ and $S_7$ of the seven servo regions 1001 second from the top are in the same position in the vertical direction in the figure, and in the same position as the center positions $D_1$, $D_2$, $D_3$, $D_4$, $D_5$, $D_6$ and $D_7$ of the data regions 1002 adjacent to respective servo regions in the vertical direction in the figure.

When the head accesses information, the position of the head is controlled on the basis of the information on the position of the head at that time as read out by the head from the servo regions 1001, so that the position of the head (specifically, the position of the reproducing element or the recording element in the head) becomes the center position of respective servo regions (for example the center positions $S_1$, $S_2$, $S_3$, $S_4$, $S_5$, $S_6$ and $S_7$ in FIG. 1). Specifically, the feedback control is executed so that the difference between the head position and the center position of the servo region 1001, which is identified by readout of the servo region 1001 at the time when the head region passes through the servo region 1001, becomes zero. And thereby, the head position coincides with the center position of each servo region 1001. As a result of this control, the head accesses information along the center line, which passes through the center of each data region 1002 adjacent to each servo region 1001 (for example the dotted line in FIG. 1) in ideal magnetic discs 1000, and thus, precise recording/reproducing of information is realized.

In reality, however, it is difficult to provide a magnetic disc where the data regions 1002 extend straight in the direction of the circumference of the magnetic disc 1000 and the center position of respective servo regions coincides each other in the direction of the radius of the magnetic disc 1000, as in ideal magnetic discs 1000, as illustrated in FIG. 1. This is because errors easily occur in the manufacture of magnetic discs. For example, the annular regions sometimes become undulated in the process of forming the annular regions, and as a result, data regions undulate. In addition, in the step of dividing the line regions into the unit storage regions (that is, the servo regions) position information in the respective unit storage regions into which the line regions are divided, the position where position information is recorded may shift, and as a result, the center positions of two servo regions adjacent to the same data region may shift to each other in the direction of the radius of the magnetic disc.

FIG. 2 is a diagram illustrating a magnetic disc 2000 where the data regions undulate and servo regions shift in position.

In the magnetic disc 2000 illustrated in FIG. 2, the respective data regions 2002 do not extend straight in the direction of the circumference of the magnetic disc 2000 in FIG. 2 (horizontal direction in figure), and thus undulate. In addition, the center positions are different from each other for the respective servo regions 1001 aligned in the horizontal direction in the figure.

When the position of the head is controlled so that it comes to the center positions of the respective servo regions 1001 with respect to the magnetic disc 2000, where the data regions undulate and the center position of the servo regions shifts in position as described above, the track of the head deviates from the data regions and enters into the nonmagnetic region 2003. When the head moves to the right in FIG. 2 relative to the data region 2002 second from the top in the magnetic disc 2000 in FIG. 2 in order to access information, for example, the head moves in such a manner that the center positions $P_1$, $P_2$, $P_3$, $P_4$, $P_5$, $P_6$ and $P_7$ of the seven servo regions 1001 becomes the position of the head, and the track 5101 largely undulates in the vertical direction, as illustrated in FIG. 2. At this time, the data regions 2002 undulate, and thus, as illustrated in FIG. 2, the track 5101 of the head largely deviates from the data regions 2002 and enters deep into the nonmagnetic region 2003 in some portions. In this state, it is difficult to record/reproduce information with precision.

In order to prevent this, a new region where position correcting information is recorded to indicate the amount of position shift in the direction of the radius of the magnetic disc between the center position of the data region and the center position of the servo region is provided between servo regions and data regions, and an HDD for correcting the position of the head on the basis of the amount of position shift as read out from this region has been proposed (see, for example, Japanese Laid-open Patent Publication No. 2006-031846).

FIG. 3 is a diagram illustrating a magnetic disc 3000 having regions where position correcting information is stored, and FIG. 4 is a block diagram illustrating the control of positioning of the head in an HDD which adopts this magnetic disc 3000.

In the magnetic disc 3000 adopted in the HDD in Japanese Laid-open Patent Publication No. 2006-031846 illustrated in FIG. 3, correction information regions 3004 are provided between the date regions 3002 and the servo regions 3001 in FIG. 3. In this magnetic disc 3000, sets of servo regions 3001, correction information regions 3004 and data regions 3002 form individual sectors, and these sectors are aligned in the direction of the circumference of the magnetic disc 3000 and run around the center of the disc, and thus, tracks are formed. Position correcting information indicating the amount of position shift in the direction of the radius of the magnetic disc 3000 between the center position of the data region 3002 adjacent to a correction information region 3004 and the center position of the servo region 3001 adjacent to this correction information region 3004 is recorded in the same correction information region 3004. In the correction information region 3004a in the center in FIG. 3, for example, position correcting information indicating the amount of position shift ho between the center position Do of the data region 3002 to the right of this correction information region 3004 and the center position So of the servo region 3001 to the left of the same correction information region 3004a is recorded in the correction information region 3004a in the center in FIG. 3. In the HDD in Japanese Laid-open Patent Publication No. 2006-031846, a table for correcting the position (position correcting table) which illustrates the amount of position shift as read out from the respective correction information regions 3004 corresponding to the data regions 3002 adjacent to the respective correction information regions 3004 is prepared when the magnetic disc 3000 is incorporated in the HDD and stored in the memory 4000d in FIG. 4.

In the HDD in Japanese Laid-open Patent Publication No. 2006-031846, a system in which feedback control is carried out so that the difference between the position of the head and the center position of the data region 3002 in the direction of the radius of the magnetic disc 3000 becomes zero is adopted instead of the system where feedback control is carried out so that the difference between the position of the head and the center position of the servo region 3001 in the direction of the radius of the magnetic disc 3000 becomes zero. Specifically, as illustrated in FIG. 4, first, the difference s ($s=r_s-y$) between the distance y between the center of the magnetic disc and the position of the head at that time and the distance $r_s$ between the center of the magnetic disc and the center position of the servo region 3001 is read out from this servo region 3001. Next, a feed forward (FW) control section 4000c finds the difference h ($h=r_d-r_s$) between the distance $r_s$ between the center of the magnetic disc and the center position of the servo region 3001 and the distance $r_d$ between the center position of the data region 3002 facing this servo region 3001 and the center of the magnetic disc with the correction information region 3004 intervening in between using the position correcting table stored in the memory 4000d in the feed forward control section 4000c and transfers the difference h to a correction adder 4000a. The correction adder 4000a adds the transferred difference h to the difference s between the distance y to the position of the head and the distance $r_s$ to the center position of the servo region 3001, and thus, the difference t (t=s+h=rd−y) between the distance y to the position of the head and the distance $r_d$ to the center position of the data region 3002 is found. Next, the feedback (FB) control section 4000b finds the feedback control value u for feedback control which makes the difference t zero, and a voice coil motor which moves the head is controlled using this feedback control value u. The feedback control value u is, specifically, a value of a current supplied to the voice coil motor. When the voice coil motor is controlled in this manner the head moves to a position at a distance y from the center of the disc. In this figure, the voice coil motor and the head are collectively represented as a plant 5000, and the plant 5000 outputs the distance y when the feedback control value u is inputted in the flow of control. After the head has moved, it reads out the servo region 3001 for destination so as to find a new difference s between a new distance y to the position of the head and a new distance $r_s$ to the center position of the servo region 3001, and the same control as described above is carried out on the basis of this difference. When this control is repeated, the position of the head y approaches the center position $r_d$ of the data region 3002 as time elapses.

As a result of this control, the head moves, drawing a track following the data regions 3002 aligned in the horizontal direction in FIG. 3 without entering deep into the nonmagnetic region 1003, as the track 5102 in FIG. 3, even when the data regions 3002 undulate.

In the system described in Japanese Laid-open Patent Publication No. 2006-031846, however, it takes time to make the difference t between the distance y to the position of the head and the distance $r_d$ to the center position of the data region 3002 zero through feedback control in magnetic discs 3000 where the difference h between the distance $r_s$ to the center position of the servo region 3001 and the distance $r_d$ to the center position of the data region 3002 is largely different in each data region 3002, that is, in magnetic discs 3000 where the distance between the position of the servo region 3001 and the position of the data region 3002 fluctuate in a high frequency in the direction of the radius of the magnetic disc, and as a result, the position of the head cannot sufficiently be prevented from fluctuating at the time of access.

FIG. 5 is a diagram illustrating the effects of correcting the position using a position correcting table in the case where the difference h between the distance $r_s$ to the center position of the servo region 3001 and the distance $r_d$ to the center position of the data region 3002 fluctuates with a period of one fifth of the length of the track in this position, and FIG. 6 is a diagram illustrating the effects of correcting the position using a position correcting table in the case where the difference h between the distance $r_s$ to the center position of the servo region 3001 and the distance $r_d$ to the center position of the data region 3002 fluctuates with a period of one tenth of the length of the circumferential length of the track in this position.

For the sake of simplicity, FIGS. 5 and 6 illustrate the results of simulation in the case where only the data regions undulate and there is no shift of position in the center position of the servo regions, as illustrated in FIGS. 2 and 3, in the magnetic disc.

Part (a) of FIG. 5 and part (a) of FIG. 6 are graphs illustrating how the difference t (hereinafter referred to as position error t) between the distance y to the position of the head and the distance $r_d$ to the center position of the data region 3002 changes in magnetic discs 3000 where 220 data regions 3002 are aligned per track in the direction of the circumference of the disc (that is, in magnetic discs 3000 where the number of sectors per track is 220) with the number of sectors defined in the lateral axis. Here, the position error t is the ratio (%) relative to the width of the track.

In the graphs of part (a) of FIG. 5 and part (a) of FIG. 6, solid lines represents the position error t in the case where no position correcting table is used, and dotted lines represents the position error t in the case where the position is corrected using the respective position correcting tables illustrated in part (b) of FIG. 5 and part (b) of FIG. 6.

The position correcting tables in part (b) of FIG. 5 and part (b) of FIG. 6 respectively correspond to the graphs for the change in the difference h between the distance $r_s$ to the center position of the servo region 3001 (the distance $r_s$ has a constant value in this simulation) and the distance $r_d$ to the center position of the data region 3002, and illustrate the position correcting values for the respective sectors that are included in the position correcting table with the ratio (%) relative to the track width as the unit.

As illustrated in part (a) of FIG. 5, in the case where the difference h between the distance $r_s$ to the center position of the servo region 3001 and the distance $r_d$ to the center position of the data region 3002 fluctuates in a high frequency with a period of one fifth of the circumferential length of the track in that position, the graph having dotted lines, where the position is corrected using the position correcting table, fluctuates with a slightly smaller amplitude, than in the graph having solid lines, where the position is not corrected, and thus, it can be seen that the device can be improved, though only slightly, by correcting the position using the position correcting table.

In addition, as illustrated in part (a) of FIG. 6, in the case where the difference h between the distance $r_s$ to the center position of the servo region 3001 and the distance $r_d$ to the center position of the data region 3002 fluctuates in a high frequency with a period of one tenth of the circumferential length of the track in that position, the graph having dotted lines, where the position is corrected using the position correcting table fluctuate with a larger amplitude, than in the graph having solid lines, where the position is not corrected, and thus, it can be seen that the head actually ends up fluctuating more when the position is corrected using the position correcting table. This is because the feedback control cannot follow promptly enough in when vibrating with a high frequency, and therefore, the feedback control to amplify the oscillation instead of suppressing it.

As described above, the position of the head cannot sufficiently be prevented from oscillating when the head accesses information in the magnetic disc 3000, where the distance between the position of the servo region 3001 and the position of the data region 3002 fluctuates in a high frequency in the direction of the radius of the magnetic disc in the system described in Japanese Laid-open Patent Publication No. 2006-031846, and thus, a problem arises, such that it is difficult to record/reproduce information with precision.

Though an HDD is exemplified for the description above, the problem described above is not limited to HDD, and could arise with other general information storage devices in which the position of the head is determined by reading out information from servo regions.

SUMMARY

An information storage device, where an information storage medium in form of disc in which information is stored is rotated, and a head is moved above the rotating information storage medium in order to access information, includes:

a drive section that moves the head above the information storage medium; and a control section that controls the drive section, wherein the information storage medium is formed such that plural tracks in stripe-shape that extend in the direction of the circumference of the information storage medium and circle around a center of the disc of the information storage medium are aligned in the direction of the radius of the information storage medium, and each of the plural tracks is formed such that a first region and a second region repeat alternately, the first region is a regions for user information to be written in and to be read from and extend in stripe-shape in the direction of the circumference and the second region stores information for positioning the head, and the control section includes:

a feedback control value determining section that finds a difference between a position of the head in the direction of the radius which is obtained through reading by the head in the second region and a representative position of the first region as an object for accessing in the direction of the radius and that determines a feedback control value for feedback control to eliminate the difference;

a control performing value determining section that has a table where the first region is associated with a logic control value, the control value being logically required to move the head to the representative position in the first region, finds the logic control value associated with the first region for which the feedback control value is determined by the feedback control value determining section using the table, and determines a control performing value for performing control by adding the feedback control value determined by the feedback control value determining section to the logic control value; and a control performing section that performs control over the drive section on the basis of the control performing value determined by the control performing value determining section.

BRIEF DESCRIPTION OF DRAWINGS

FIG. 13 is a diagram illustrating the effects of correcting the position and correcting the control value using a position correcting table and a control value correcting table in the case where the difference h between the distance $r_s$ to the center position of the servo region and the distance $r_d$ to the center position of the data region fluctuates with a period of one fifth of the circumferential length of the track in that position;

FIG. 14 is a diagram illustrating the effects of correcting the position and correcting the control value using a position correcting table and a control value correcting table in the case where the difference h between the distance $r_s$ to the center position of the servo region and the distance $r_d$ to the center position of the data region fluctuates with a period of one tenth of the circumferential length of the track in that position;

DESCRIPTION OF EMBODIMENTS

Embodiments corresponding to information storage devices of the basic mode (and the modified mode) will be described below in reference to the drawings.

Figure 7:
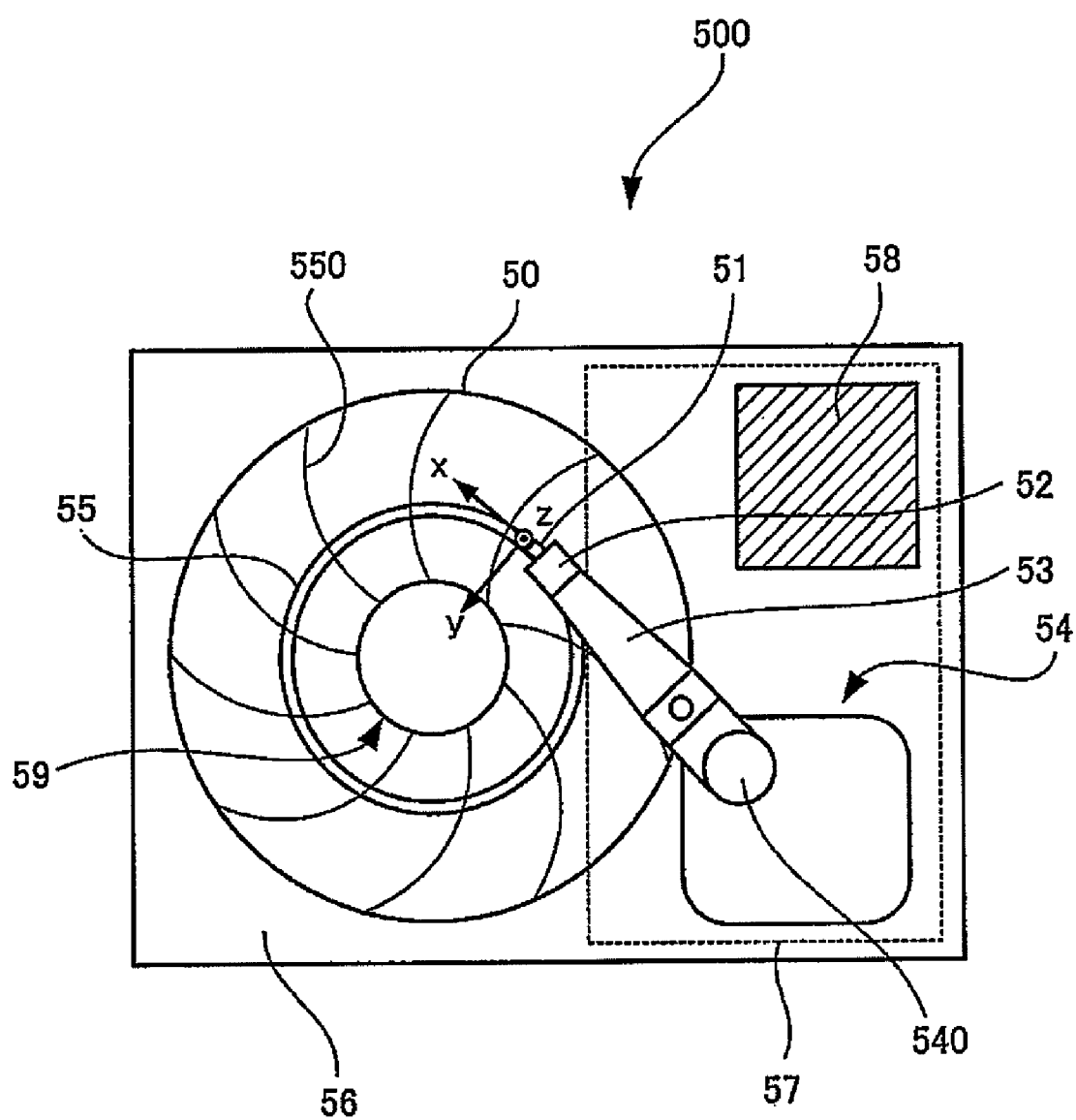
FIG. 7 is a diagram illustrating a hard disc device (HDD) in the information storage device according to an embodiment.

FIG. 7 is a diagram illustrating a hard disc device (HDD) 500 according to an embodiment of an information storage device.

The HDD 500 illustrated in FIG. 7 is provided with a voice coil motor 54 in which a voice coil as a movable coil and a permanent magnet for applying a constant magnetic field to the voice coil are incorporated. In this voice coil motor 54, the voice coil moves when a current flows through the voice coil, and a rotary drive force with a drive axis 540 as the rotary axis is generated when the voice coil moves. The voice coil motor 54 supports an arm 53, and the arm 53 receives a rotary drive force from the voice coil motor 54 to rotate around the drive axis 540. A slider 52 is attached to the tip end of the arm 53 by means of a support member, referred to as gimbal, and furthermore, a head 51 is attached to the tip end portion of this slider 52.

The head 51 works to read information from the magnetic disc 50 and write information into the magnetic disc 50, and has two elements: a recording element for writing information into the magnetic disc 50 (not illustrated in FIG. 7) and an reproducing element for reading information from the magnetic disc 50 (not illustrated in FIG. 7). At the time of reading or writing information, the arm 53 is driven by the voice coil motor 54 to rotate around the voice coil motor 54, and thus, the head 51 is moved to a desired position above a surface of the magnetic disc 50. At this time, the head 51 is kept floating at a fine distance above the surface of the magnetic disc 50 in disc form, and in this state, information is read from the magnetic disc 50 and written into the magnetic disc 50. In this diagram, the head 51 is illustrated as part of a xyz orthogonal coordinate system, where the position of the head 51 is the origin, the direction to the center in the magnetic disc 103 is the y axis, and the direction of the normal to the figure is the z axis.

The surface of the magnetic disc 50 in disc form is provided with a configuration where a number of stripe-shaped tracks in which run around the center of the disc are aligned in the direction of the radius, and FIG. 7 illustrates one track 55 of these tracks. In addition, as illustrated in this figure, a number of regions 550 which store information for positioning the head are provided on the surface of the magnetic disc 50 in disc form in a line form from the center of the disc to the circumference of the disc.

The portion of the track 55 in FIG. 7 which extends in the direction of the circumference in stripe-shaped between the two line regions 550 is provided with a data region for writing and reading user information (hereinafter simply referred to as "data").

In addition, one line region 550 is divided into a number of unit storage regions associated with the respective tracks with which the line region 550 cross, and each of these stores information for positioning the head in accordance with the position. Here, "information for positioning the head" includes both information on the position on the magnetic disc 1000 (position information) and correction information for correcting the position of the head, and the unit storage regions are formed of servo regions for storing position information and correction information regions for storing correction information.

Figure 3:
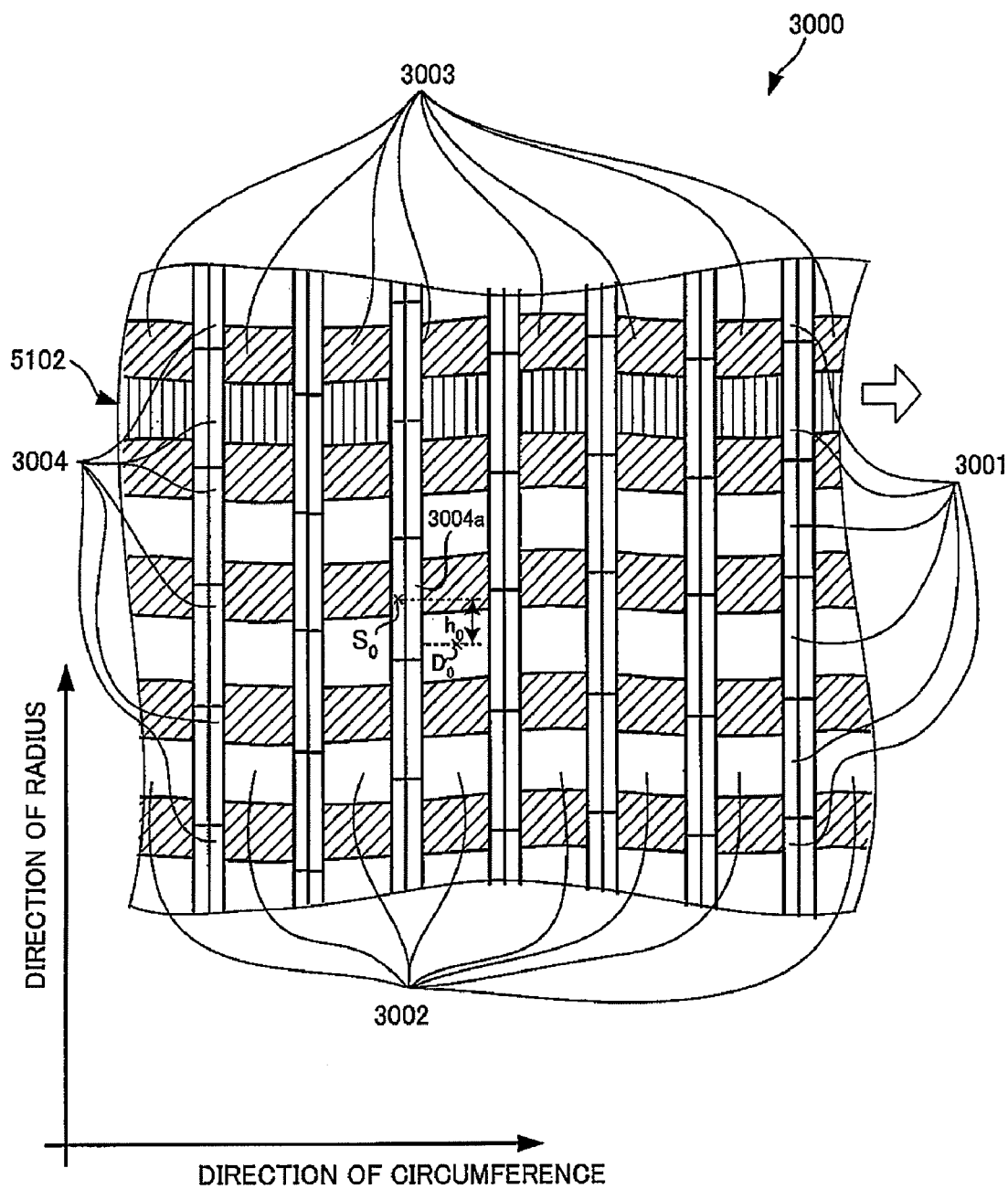
FIG. 3 is a diagram illustrating a magnetic disc having a region where position correcting information is stored.

The data regions, the servo regions and the correction information regions are provided with magnetic regions formed of a magnetic material. The local arrangement of the respective regions is the same as the arrangement of the data regions 3002, the servo regions 3001 and the correction information regions 3004 as illustrated in FIG. 3, except that the contents of correction information stored in the correction information regions are different, as described below, and nonmagnetic regions formed of a non magnetic material (material having extremely low susceptibility) are provided between the data regions in the direction of the radius of the magnetic disc 50 in the magnetic disc 50 in FIG. 7. In the following, the same symbols are used for the data regions, the servo regions and the correction information regions in the magnetic disc 50 in FIG. 7 as for the data regions 3002, the servo regions 3001 and the correction information regions 3004 in the magnetic disc 3000 illustrated in FIG. 3.

Figure 8:
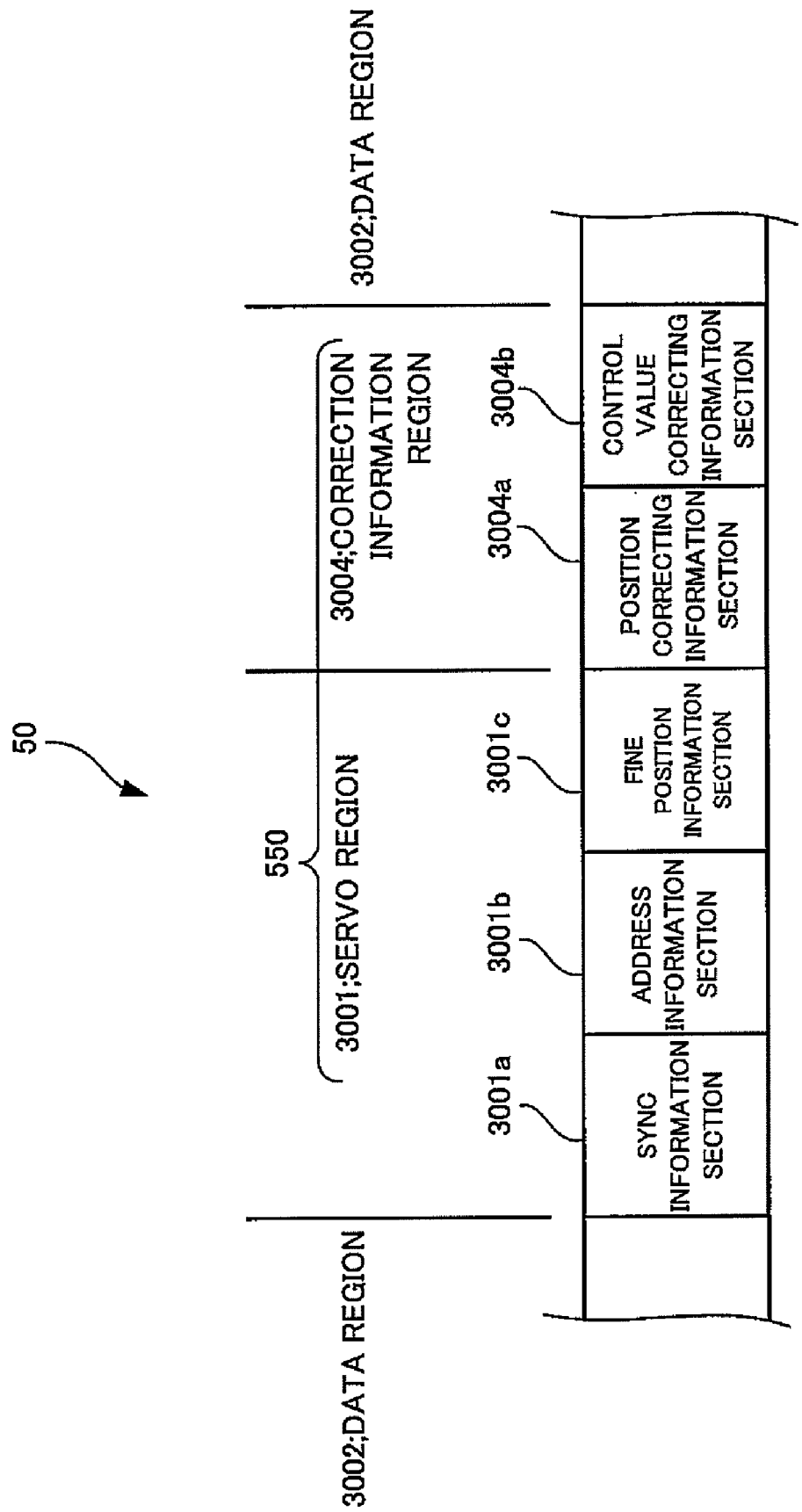
FIG. 8 is a diagram illustrating the configuration of the servo region and the correction information region in the magnetic disc in FIG. 7.

FIG. 8 is a diagram illustrating the configuration of the servo regions 3001 and the correction information regions 3004 in the magnetic disc 50 in FIG. 7.

As illustrated in FIG. 8, the magnetic disc 50 is provided with a configuration where the data regions 3002, the servo regions 3001 and the correction information regions 3004 are aligned in this order.

Figure 1:
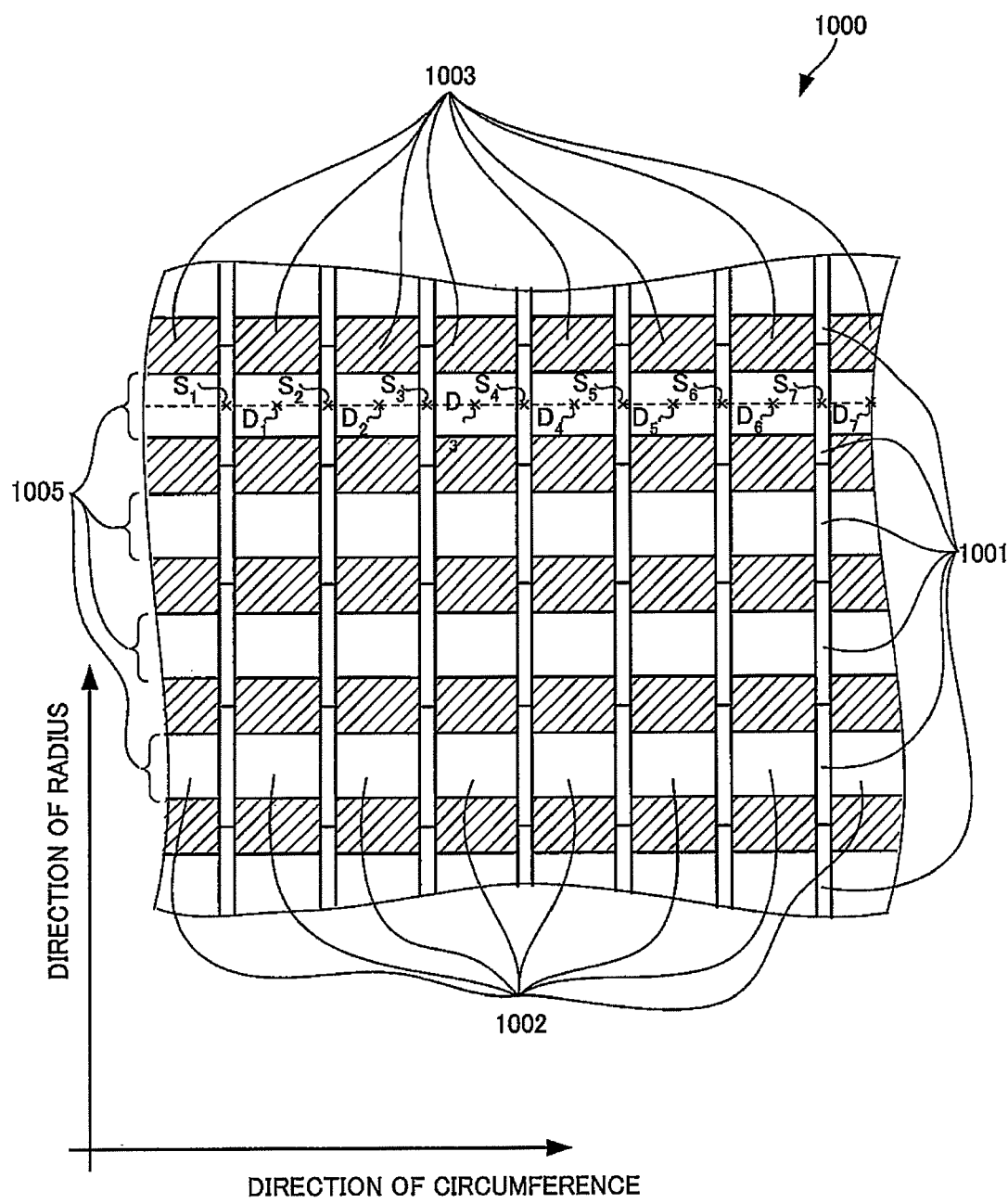
FIG. 1 is a diagram illustrating an ideal magnetic disc, where data regions and servo regions are regularly aligned in accordance with a predetermined positional relationship.

The servo region 3001 in FIG. 8 is provided with a sync information section 3001*a*, where a sync signal for determining the timing for taking out a signal for position information is recorded, an address information section 3001*b*, where address information, such as the track number and sector number, is recorded, and a fine position information section 3001*c*, where scale information on how far the position is from the center position of the servo region 3001 in a direction of the radius of the magnetic disc 50 (see description in FIGS. 1 to 3) is recorded.

Meanwhile, the correction information region 3004 in FIG. 8 is provided with a position correcting information section 3004*a*, where position correcting information which indicates the amount of position shift between the center position of the data region 3002 adjacent to the correction information region 3004 and the center position of the servo region 3001 adjacent to the correction information region 3004 in a direction of the radius of the magnetic disc 50 is recorded. In addition, the correction information region 3004 is provided with a control value correcting information section 3004*b*, where control value correcting information which indicates the logical control value (logical control value) which is to be provided to the voice coil motor 54 in order to move the head 51 in FIG. 7 to the center position of the data region 3002 is recorded.

Here, though the position correcting information recorded in the position correcting information section 3004*a* is the same as that recorded in the correction information region 3004 in the magnetic disc 3000 in FIG. 3 (see description for FIG. 3), the magnetic disc 50 in FIG. 7 is different from the magnetic disc 3000 in FIG. 3 in that the control value correcting information section 3004*b* is provided on top of the position correcting information section 3004*a*. The logical control value is described in detail later.

In the data region 3002, the servo region 3001 and the correction information region 3004, unit storage regions for storing one-bit of information, referred to as one-bit regions, are aligned in the direction in which the tracks 55 extend in FIG. 7. The HDD 500 in FIG. 7 adopts a vertical magnetic recording system, and in each one-bit region, magnetization in the positive direction of the z axis or magnetization in the negative direction in FIG. 7 is provided, and these magnetizations in both directions indicate one-bit information. This magnetic disc 50 receives a rotational drive force from the spindle motor 59 and rotates in the plane in FIG. 7 with the center of the disc as the center of rotation, so that the head 51 located close to the surface of the magnetic disc 50 comes closer to each one-bit region in the track 55 on the rotating magnetic disc 501 in sequence.

When the data, the position information and the correction information are reproduced, the reproducing element in the head 51 reproduces information recorded in a form of the direction of magnetization in each one-bit region by generating an electrical signal for reproduction in accordance with the magnetic field generated from each bit, and the reproduced signal is outputted to the head amp 58. In addition, when the data is recorded, an electrically recorded signal is inputted into the recording element in the head 51 in the vicinity of the magnetic disc 50 via the head amplifier 58, and the recording element applies a magnetic field to each one-bit region in the data region in accordance with the inputted recording signal and records the information carried by the recording signal in the format of the direction of magnetization of each one-bit region.

The head 51 comes closer to the data region 3002, the servo region 3001 and the correction information region 3004 in sequence as the magnetic disc 50 rotates, and the data is reproduced and recorded when the head 51 comes closer to the data region 3002, and position information is read out when the head 51 comes closer to the servo region 3001 and the correction information region 3004. Reproduction/recording of data and reading out of position information as described above alternate.

In the following description, the recording element 51b and the reproducing element 51a of the head 51 are located close to each other, and thus, the reproducing element 51a and the recording element 51b are in approximately the same position. The position of the reproducing element 51a and the recording element 51b is simply referred to as position of head 51 (head position) in the following.

Sections relating directly to storage and reproduction of information, such as the voice coil motor 54, arm 53, slider 52, head 51 and head amplifier 58 described above, are contained in the base 56, together with the magnetic disc 50, and FIG. 7 illustrates the inside of the base 56. A control board 57 having a control circuit for controlling the respective sections described above is provided on the rear surface of the base 56, and the control board 57 is indicated by a dotted line in FIG. 7. The respective sections described above are electrically connected to this control board 57 through a mechanism which is not illustrated, so that the recording signal inputted into the head 51 and the reproduced signal generated in the head 51 are processed in the control board 57 via the head amplifier 58.

Next, the control board 57 is described.

Figure 9:
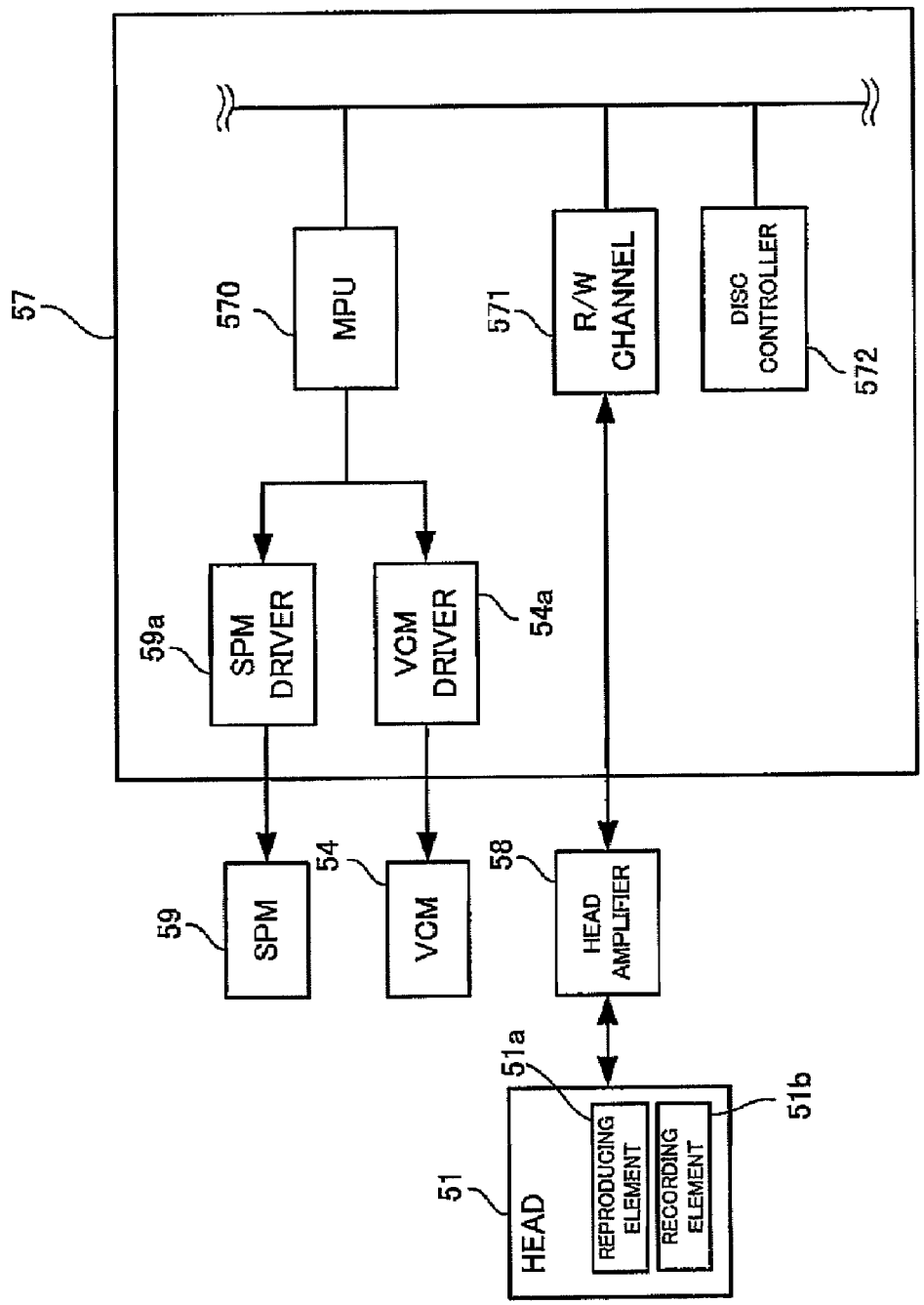
FIG. 9 is a diagram illustrating the control mechanism provided in the control board 57.

FIG. 9 is a diagram illustrating the control mechanism provided in the control board 57.

The control board 57 is provided with an MPU (Micro Processing Unit) 570, which controls the voice coil motor (VCM) 54 via the voice coil motor (VCM) driver 54a, and controls the spindle motor (SPM) 59 via the spindle motor (SPM) driver 59a, and a disc controller 572 which controls recording/reproducing (accessing) of data in the magnetic disc 55 by means of the head 51 in FIG. 7. In addition, the control board 57 is also provided with an R/W channel 571 which carries out a signal process on the reproduced signal and the recording signal.

When data is recorded, a recording signal is inputted into the R/W channel 571 from an external apparatus, such as a computer, connected to the HDD 500 via the disc controller 572, and a signal process for recording appropriate magnetic information at the time of reproduction is carried out in the R/W channel 571. The recording signal is amplified by the head amplifier 58 after the signal process, and after that inputted into the recording element 51b in the head 51, and thus, as described above, data is recorded in the magnetic disc 50.

When data is reproduced, position information is reproduced and correction information is reproduced, as described above, a reproduced signal is generated by the reproducing element 51a in the head 51, and this reproduced signal is amplified by the head amplifier 58, and after that inputted into the R/W channel 571, and thus, various signal processes are carried out.

Here, the reproduced signal for data is sent to the disc controller 572 after the signal process in the R/W channel 571, and undergoes such a process as error correction decoding, and after that is sent to an external apparatus (such as a computer) connected to the HDD 500 from the disc controller 572.

The reproduced signal for position information and correction information is inputted into the MPU 570 after the signal process in the R/W channel 571. The MPU 570 receives an instruction for controlling the positioning of the head 51 from the disc controller 572, and controls the voice coil motor (VCM) 54 via the voice coil motor (VCM) driver 54a on the basis of the reproduced signal of the inputted position information and correction information, so that the positioning of the head 51 is controlled. Data is recorded and reproduced after the head 51 moves to a desired position for recording and reproducing data, as described above, through the control of the positioning of the MPU 570.

Here, a signal process for a reproduced signal for position information will be described.

Figure 10:
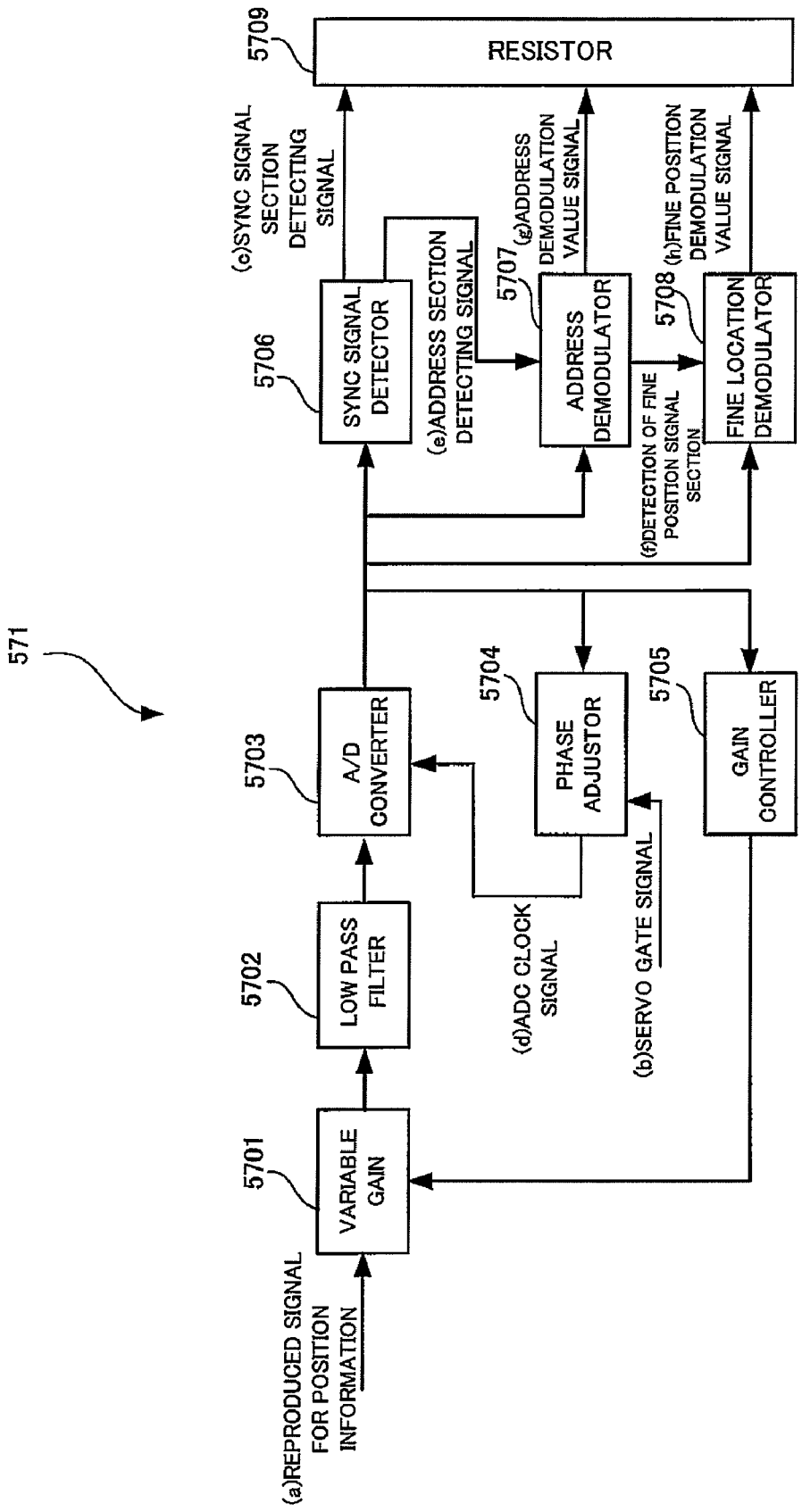
FIG. 10 is a block diagram illustrating the operation of the R/W channel at the time of signal processing of a signal reproduced from position information.
Figure 11:
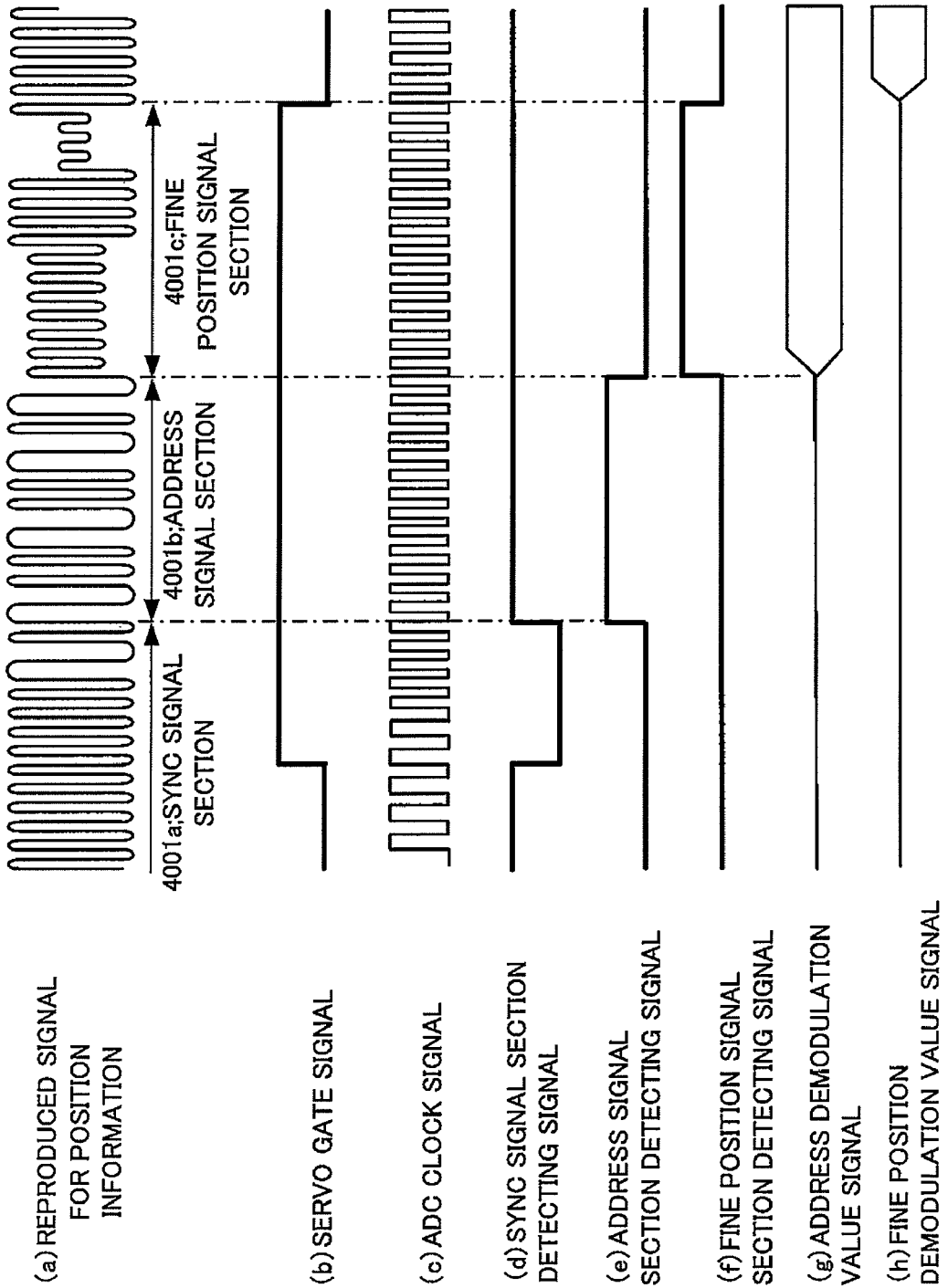
FIG. 11 is a diagram illustrating various types of signal waveforms at the time of signal processing of a signal reproduced from position information.

FIG. 10 is an operation block diagram illustrating the operation of the R/W channel 571 at the time of the signal process for the reproduced signal for position information, and FIG. 11 is a diagram illustrating the waveform for various types of signals at the time of the signal process for the reproduced signal for position information.

Part (a) of FIG. 11 illustrates the waveform of a reproduced signal for position information after amplification by the head amplifier 58. As illustrated in part (a) of FIG. 11, the reproduced signal for position information after amplification is formed of signals, the sync signal section 4001a, the address signal section 4001b and the fine position signal section 4001c generated by reading out respective regions of the sync information section 3001a, address information section 3001b and fine position information section 3001c in FIG. 8. The reproduced signals illustrated in part (a) of FIG. 11 are inputted sequentially into the variable gain section 5701 in FIG. 10 at time intervals corresponding to the angular velocity of the magnetic disc 50. An amplification process is carried out on the reproduced signals under a preset gain control value in the variable gain section 5701, and furthermore, high frequency noise components are removed by the low pass filter 5702. In addition, the reproduced signals from which noise components are removed are transferred to the A/D converter 5703 and converted to digital signals from analog signals on the basis of the ADC clock signal illustrated in part (c) of FIG. 11, which is inputted from the phase adjustor 5704. The reproduced signals converted to digital signals in the A/D converter 5703 are inputted into the phase adjustor 5704, the gain adjustor 5705, the sync signal detector 5706, the address demodulator 5707 and the fine position demodulator 5708, in FIG. 10 respectively.

The phase adjustor 5704 is provided with a phase lock loop (PLL) circuit, and the servo gate signal in part (b) of FIG. 11 which is a signal for the start of operation of the PLL circuit, is inputted into the phase adjustor 5704, which then converts the sync signal section 4001a in the reproduced signals that are A/D converted to a signal of a frequency of a predetermined times higher than the original by the PLL circuit, and thus generates the ADC clock signal illustrated in part (c) of FIG. 11. This ADC clock signal is a signal which differentiates the sync signal section 4001a in the reproduced signal from the address signal section 4001b and the fine position signal section 4001c. The ADC clock signal is used for A/D conversion for subsequent reproduced signals to be inputted into the A/D converter 5703.

The gain controller 5705 controls the gain control value set in the variable gain section 5701 on the basis of the reproduced signal converted to a digital signal, so that the next reproduced signal inputted into the variable gain section 5701 can be amplified to an reproduced signal having an optimal amplitude in the variable gain section 5701.

The sync signal detector 5706 detects the position of the sync signal section 4001a in the reproduced signal, and generates the sync signal section detecting signal in FIG. 11(d), which indicates the starting point and the end point of the sync signal section 4001a. The generated sync signal section detecting signal is recorded in the resistor 5709. In addition, the sync signal detector 5706 detects the position of the address signal section 4001b in the reproduced signal, and generates the address signal section detecting signal in FIG. 11(e), which indicates the starting point and the end point of the address signal section 4001b, and the generated address signal section detecting signal is inputted into the address demodulator 5707.

The address demodulator 5707 demodulates the address signal section 4001b in the reproduced signal on the basis of the address signal section detecting signal, and generates the address demodulation value signal in FIG. 11(g), which indicates the demodulated address value. The generated address demodulation value signal is recorded in the resistor 5709. In addition, the address demodulator 5707 detects the position of the fine position signal section 4001c in the reproduced signal and generates the fine position signal section detecting signal in FIG. 11(f), which indicates the starting point and the end point of the fine position signal section 4001c and the generated fine position signal section detecting signal is inputted into the fine position demodulator 5708.

The fine position demodulator 5708 demodulates the fine position signal section 4001c in the reproduced signal on the basis of the fine position signal section detecting signal, and generates the fine position demodulation value signal in FIG. 11(g), which indicates the demodulated fine position. The generated fine position demodulation value signal is recorded in the resistor 5709.

Next, the control of the positioning of the head 51 by the MPU 570 will be described in detail.

Figure 12:
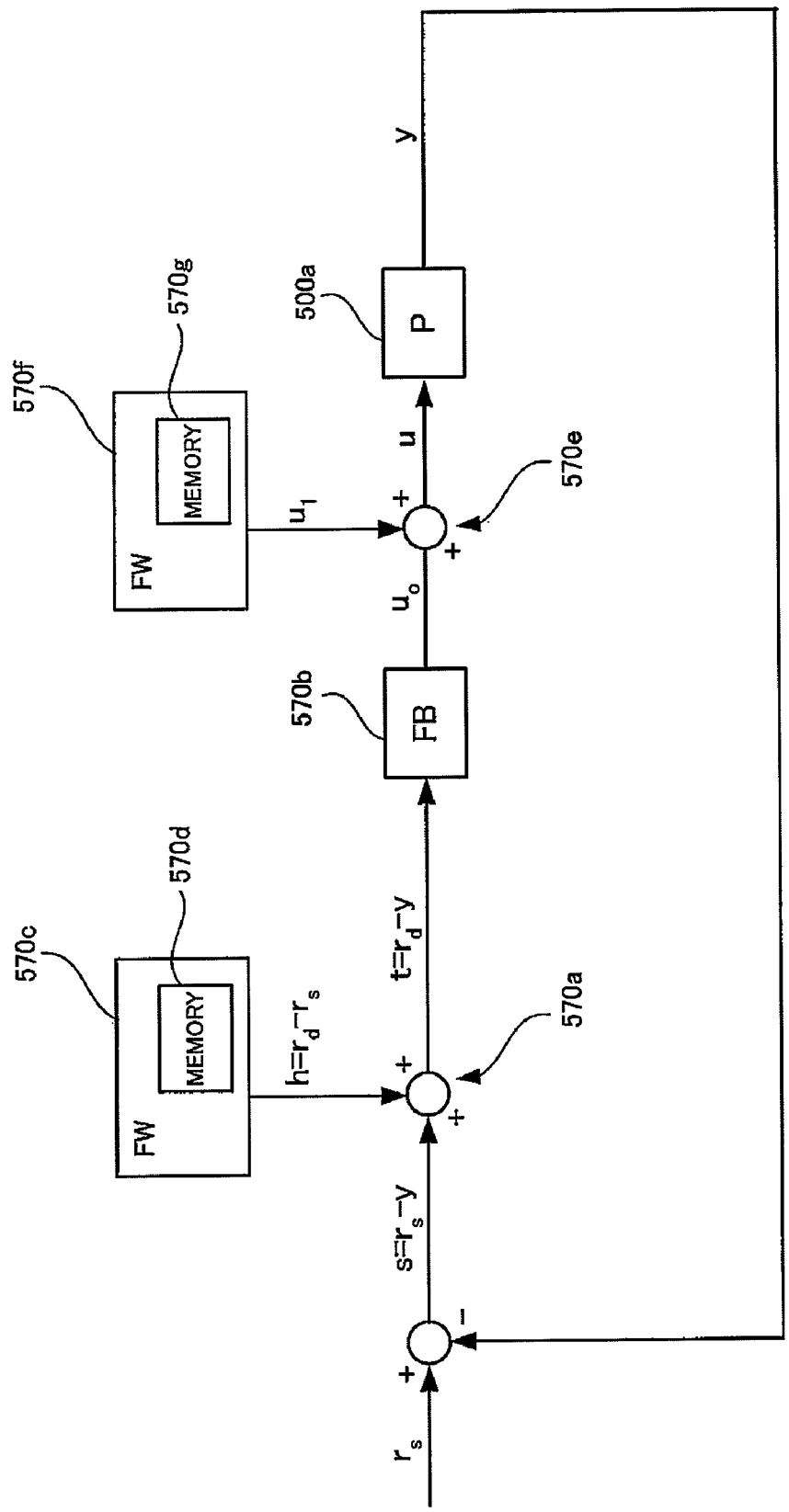
FIG. 12 is a control block diagram illustrating control for positioning the head using an MPU.

FIG. 12 is a control block diagram illustrating the control of positioning of the head 51 by the MPU 570.

The control block diagram of FIG. 12 illustrates a first feed forward (FW) control section 570c, a second feed forward (FW) control section 570f, a feedback (FB) control section 570b, a first correction adder 570a and a second correction adder 570e, and each of these is used in the operation carried out by the MPU 570.

A table (position correcting table) for correcting the position which table indicates that the amount of position shift between the center position of the data region 3002 adjacent to the correction information region 3004 in FIG. 8 and the center position of the servo region 3001 adjacent to the correction information region 3004 is associated with a sector in the data region 3002 (substantially equivalent to being associated with the data region 3002) is stored in the first memory 570d in the first feed forward (FW) control section 570c. In addition, a table (control value correcting table) for correcting the control value, which table indicates that the logical control value (logical control value) to be supplied to the voice coil motor 54 in order to move the head 51 in FIG. 7 to the center position of the data region 3002 is associated with the sector in this data region 3002 is stored in the second memory 570g in the second feed forward (FW) control section 570f. The position correcting table and the control value correcting table are tables to be created by associating the amount of position shift and the logical control value obtained through readout in the position information correcting section 3004a and the control value correcting information section 3004b in the correction information 3004 in FIG. 8 with the sector in the correction information region 3004 (substantially equivalent to associating the amount and value correspond with the data region 3002 adjacent to correction information region 3004) when the magnetic disk 50 in FIG. 7 is incorporated in the HDD 500. Here, though the control block in FIG. 12 illustrates the first memory 570d and the second memory 570gas respectively different memories, they are the same memory included in the MPU 570 in FIG. 9, in terms of hardware.

Figure 4:
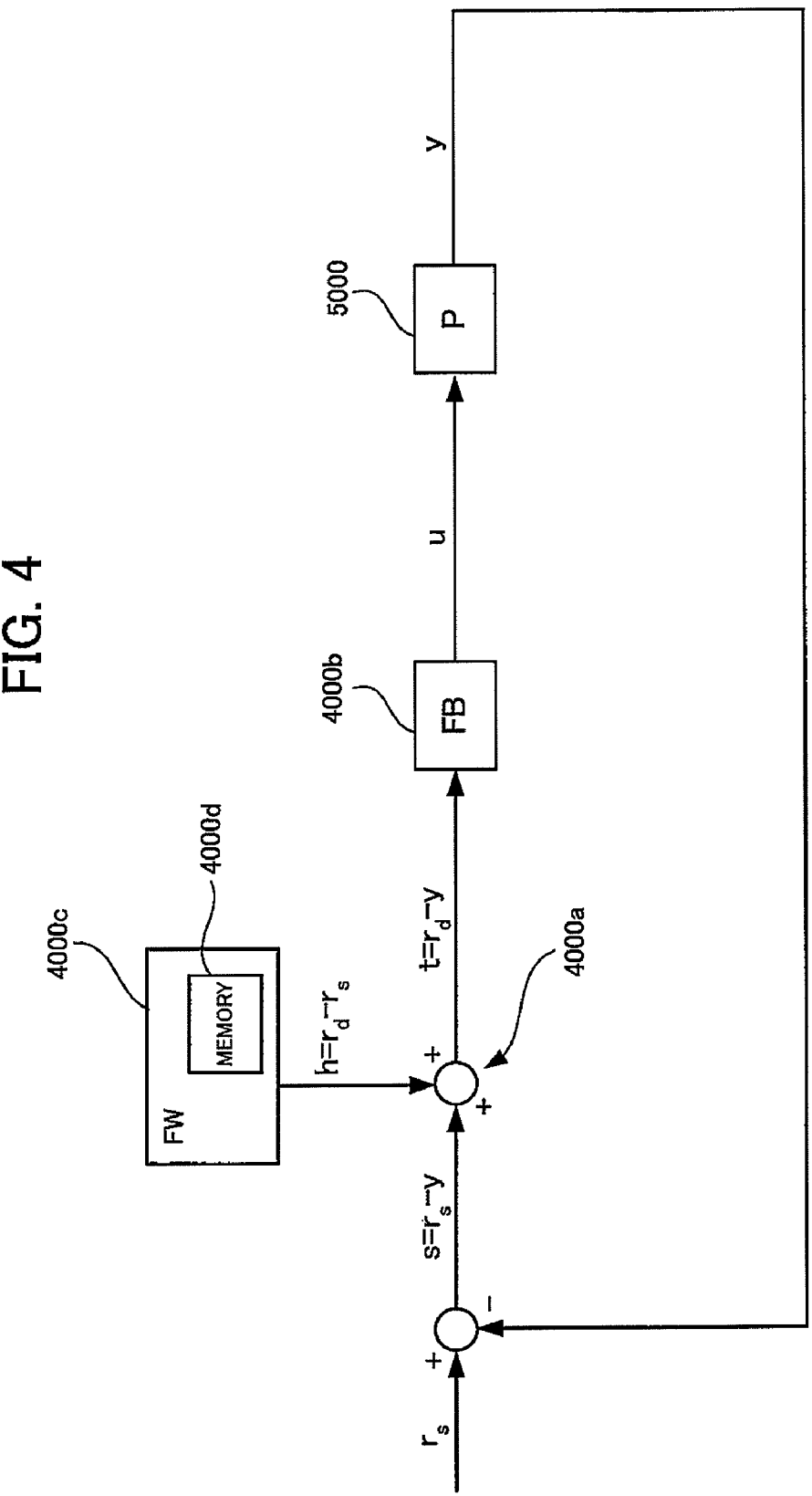
FIG. 4 is a block diagram illustrating control for positioning the head in an HDD where the magnetic disc in FIG. 3 is adopted.

Here, the first feed forward control section 570c, the feedback control section 570b and the first correction adder 570a in FIG. 12 carry out approximately the same operation as the feed forward (FW) control section 4000c, the feedback (FB) control section 4000b and the correction adder 4000a in FIG. 4, respectively, and the position correcting table is the same as the position correcting table in reference to FIG. 4.

However, unlike the control block illustrated in FIG. 4, the control block illustrated in FIG. 12 is provided with a second feed forward control section 570f and a second correction adder 570e, and the control value is corrected on the basis of the control value correcting table. This is a point in which the control block illustrated in FIG. 12 is different from the control block illustrated in FIG. 4.

In the following, the control of the positioning of the head 51 by the MPU 570 will be described in reference to FIG. 12.

First, the difference s ($s=r_s-y$) between the distance y between the center of the magnetic disc and the position of the head at that time and the distance $r_s$ between the center of the magnetic disc and the center position of the servo region 3001 is obtained through readout in the servo region 3001 (see FIG. 3). Next, the first feed forward (FW) control section 570c uses the position correcting table stored in the first memory 570d in the first feed forward control section 570c to find the difference h ($h=r_d-r_s$) between the distance $r_s$ between the center of the magnetic disc and the center position of the servo region 3001 and the distance $r_d$ between the center of the magnetic disc and the center position of the data region 3002, which faces the servo region 3001 with the correction information region 3004 in between, and transfers the result to the first correction adder 570a. The first correction adder 570a adds the transferred difference h to the difference s (described above) between the distance y to the position of the head and the distance $r_s$ to the center position of the servo region 3001, and thus finds the difference t ($t=s+h=r_d-y$) between the distance y to the position of the head and the distance $r_d$ to the center position of the data region 3002. Next, the feedback (FB) control section 570b finds a feedback control value $u_o$ for the feedback control which makes the difference t zero. Next, the second feed forward (FW) control section 570f uses the control value correcting table (described above) stored in the second memory 570g in the second feed forward control section 570f to find the logical control value $u_1$ which corresponds to the sector (set of the servo region 3001, correcting information region 3004 and data region 3002), and transfers this logical control value $u_1$ to the second correction adder 570a.

Here, the logic control value will be described in detail.

The track of the head 51 is examined on the basis of the equation of motion when the control value (current value) supplied to the voice coil motor 54 is u ([mA], for example, is adopted as the unit). In FIG. 7, when the head 51 is above a certain track 55, the displacement ($y-y_o$) in the position of the head is ideally found using the following equation of motion with $y_o$ as the reference, in which the average radius of the track 55 is $y_o$.

$$d^2(y-y_o)/dt^2 = k \times u \qquad (1)$$

Here, the left side "$d^2(y-r_s)/dt^2$" is obtained by differentiating $(y-y_o)$ twice for time. In addition, k on the right side is a constant determined by the moment of inertia of the voice coil motor 54, the distance between the drive axis 540 of the voice coil motor and the voice coil in the voice coil motor 54, the distance between the drive axis 540 of the voice coil motor and the head 51, a number of turns of the voice coil, the magnetic field applied to the voice coil, a circumference length of the voice coil in the direction of winding and the like.

The formula (1) is derived from the equation of motion of rotation around the drive axis 540 in FIG. 7. Here, the left side corresponds to the change in the angular momentum over time, and the right side corresponds to the torque around the drive axis 540 generated by the voice coil motor 54. Here, all of the constant coefficients are included in k in the formula (1). In general, the force which acts on the voice coil in a magnetic field is proportional to the current that flows through the voice coil, and therefore, the generated torque is also proportional to the current, and thus, the primary term of the current u appears as in the formula (1).

Here, the formula (1) applies only under ideal conditions, where the force (force for moving voice coil) generated when a current flows through the voice coil, which is proportional with the current, is taken into consideration, and the effects of other external forces (such as air resistance, the spring resistance of a buffer spring for buffering the movement of the voice coil or friction force) can be ignored, and in the case where there are external forces, such as air resistance, spring resistance of a buffering spring which buffers the movement of the voice coil and friction force, an term proportional to a result obtained by differentiating $(y-y_o)$ once for time, a term proportional to $(y-y_o)$ and an term independent of $(y-y_o)$ appear on the right side in the formula (1).

Here, it will be discussed which control value (current value) u is required for the position of the head to coincide with the center position of the respective data regions 3002 (see FIG. 3) when the head 51 passes above the respective data regions 3002. As described above in reference to FIG. 3, the center position of the data regions 3002 is generally different in accordance with the data region 3002 (that is, in accordance with the sector) in the same track 55, and therefore, the center position of the data region 3002 through which the head 51 passes as a result of the rotation of the magnetic disc 50 changes as time passes. Here, in the HDD 500, the spindle motor 59 is controlled so that the rotational speed (angular speed) of the magnetic disc 50 stays approximately constant at the time of access, and therefore, the number of data regions 3002 (or sectors) through which the head 51 passes per unit hour is constant. Therefore, the change in the position of the center in accordance with the number of data regions 3002 (sector number) is proportional to the change in the position of the center in accordance with the time. Here, when the logical control value (logical control value) for the position of the head to coincide with the center position of the respective data regions 3002 (see FIG. 3) is $u_1$ and $y_o$ is the reference, $(y-y_o)$ in the formula (1) is substituted with the displacement $(r_d-y_o)$ in the position of the center of the data region 3002 through which the head 51 passes, and u in the formula (1) is substituted with $u_1$, so that the following formula (2) is obtained.

$$d^2(r_d-y_O)/dt^2=k\times u_1 \quad (2)$$

Meanwhile, as described in reference to FIG. 3, the center position of the servo region 3001 is also generally different in accordance with the servo regions 3001, (that is, in accordance with the sector) in the same track 55, and therefore, the center position of the servo regions 3001 through which the head 51 passes changes over time as the magnetic disc 50 rotates. When $y_o$ is the reference, the change in the displacement $(r_s-y_o)$ of the center position of the servo regions 3001 through which the head 51 passes over time can be found through an experiment before the magnetic disc 50 is incorporated into the HDD 500. Here, the displacement $(r_s-y_o)$ can be represented by the following formula (3).

$$r_S-y_O=F(t) \quad (3)$$

Here, F(t) on the right side in the formula (3) is a function of the time as found through the experiment, as described above. The following formula (4) is obtained by differentiating the formula (3) twice.

$$d^2(r_S-y_O)/dt^2=d^2F/dt^2 \quad (4)$$

Here, the formula (3) is subtracted from the formula (2), and thus, the average radius $y_o$ of the track 55 is eliminated, so that the following formula (5) is obtained.

$$d^2(r_d-r_S)/dt^2=k\times u_1-d^2F(t)/dt^2 \quad (5)$$

The control value (current value) $u_1$ is found from the formula (5), so that the following formula (6) is obtained.

$$u_1=(1/k)\times[d^2(r_d-r_S)/dt^2+d^2F(t)/dt^2] \quad (6)$$

Here, $d^2(r_d-r_s)/dt^2$ in the formula (6) is obtained by differentiating the difference h ($h=r_d-r_s$) twice for time.

Thus, the logical control value $u_1$ on the left side in the formula (6) is found for each sector (that is, each servo region 3001 or each data region 3002) and recorded in each control value correcting information section 3004b in the magnetic disc 50 in FIG. 8 before the magnetic disc 50 is incorporated into the HDD 500. In addition, when the magnetic disc 50 is incorporated in the HDD 500, the information is read to create a control value correcting table as described above, and then, the table is stored in the second memory 570g in the second feed forward (FW) control section 570f.

Though only the effects of the force proportional to the current (force for moving voice coil) being taken into consideration is an approximation, for the sake of simplicity, in that the effects of other external forces (such as air resistance, the spring resistance of a buffer spring for buffering the movement of the voice coil, and friction force) are ignored, and it is also possible to take effects of these external forces into consideration. Specifically, in a formula where a term which is proportional to a term obtained by differentiating $(y-y_o)$ once for time, a term which is proportional to $(y-y_o)$ and a term which is independent of $(y-y_o)$ are added on the right side in the formula (1), $(y-y_o)$ in this formula (1) is substituted with the displacement $(r_d-y_o)$, and furthermore, the radius $y_o$ is eliminated by using the formula (3), so that the logical control value $u_1$ can be found in the case where the effects of these external forces are taken into consideration. In addition, the control value correcting table in the case where the effects of external forces are taken into consideration can be prepared in the same manner.

The description will be continued with reference to FIG. 12.

When receiving the logical control value $u_1$ from the second feed forward (FW) control section 570f, the second correction adder 570e adds the logical control value $u_1$ to the feedback control value $u_o$ so as to find the performing control value u, which is the sum of the logical control value $u_1$ and the feedback control value $u_o$. Then, the second correction adder 570e inputs the performing control value u into the voice coil motor 54 so as to carry out control of the voice coil motor 54. As described above, the voice coil motor 54 is controlled, and thus, the head 51 moves to a position at the distance y from the center from the disc. In this figure, the voice coil motor 54 and the head 51 are collectively illustrated as the plant 500a, and the plant 500a outputs the distance y when the performing control value u is inputted in the flow of the control. After the head moves, a new difference s between a new distance y to the position of the head and a new distance $r_s$ to the center position in the servo region 3001 is obtained through readout in the servo region 3001, and control can be carried out on the basis of this difference, as in the above. The position of the head comes closer to the center position of the data region 3002 as time passes when this control is repeated.

At this time, in the control system in FIG. 12, the voice coil motor 54 is controlled by the performing control value u obtained by adding the logical control value $u_1$ to the feedback control value $u_o$, and thus, the head 51 can move promptly toward the center position of the data region 3002 in comparison with the control system in FIG. 4. Therefore, even in the case of a magnetic disc 3000 where the distance between the position of the servo region 3001 and the position of the data region 3002 fluctuates at a high frequency in the direction of the radius of the magnetic disc, the head 51 can be sufficiently prevented from oscillating and moving away from the center position of the data region 3002. As a result, it is possible to record/reproduce information appropriately in the control system in FIG. 12. Here, though in reality, it is difficult for the head 51 to be located precisely at the center position of the data region 3002, and there is a slight shift due to environmental factors and the like even in the case where the voice coil motor 54 is controlled by the logical control value $u_1$, the shift can be corrected through feedback control in the control system in FIG. 12.

In the above description, the voice coil motor 54 in FIG. 9 corresponds to an example of the drive section in the basic mode of the information storage device, and the control board 57 in FIG. 9 corresponds to an example of the control section in the basic mode of the information storage device. In addition, the combination of the feedback control section 570b, the first correction adding section 570a and the first feed forward control section 570c in FIG. 12 corresponds to an example of the feedback control value determining section in the basic mode of the information storage device. In addition, the combination of the second feed forward control section 570f and the second correction adding section 570a of finding the performing control value u by adding the logical control value $u_1$ to the feedback control value $u_o$ corresponds to an example of the control performing value determining section in the basic mode of the information storage device. In addition, the second correction adding section 570a of controlling the voice coil motor 54 by inputting the performing control value u to the voice coil motor 54 corresponds to an example of the control performing section in the basic mode of the information storage device.

Here, results of simulation are used to illustrate how head 51 can be prevented from oscillating and moving away from the center position by adopting the control system in FIG. 12.

FIG. 13 is a diagram illustrating the effects of correcting the position and correcting the control value using a position correcting table and a control value correcting table in the case where the difference h between the distance $r_s$ to the center position of the servo region 3001 and the distance $r_d$ to the center position of the data region 3002 fluctuates with a period of one fifth of the circumferential length of the track in that position, and FIG. 14 is a diagram illustrating the effects of correcting the position and correcting the control value using a position correcting table and a control value correcting table in the case where the difference h between the distance $r_s$ to the center position of the servo region and the distance $r_d$ to the center position of the data region fluctuates with a period of one tenth of the circumferential length of the track in that position.

Figure 2:
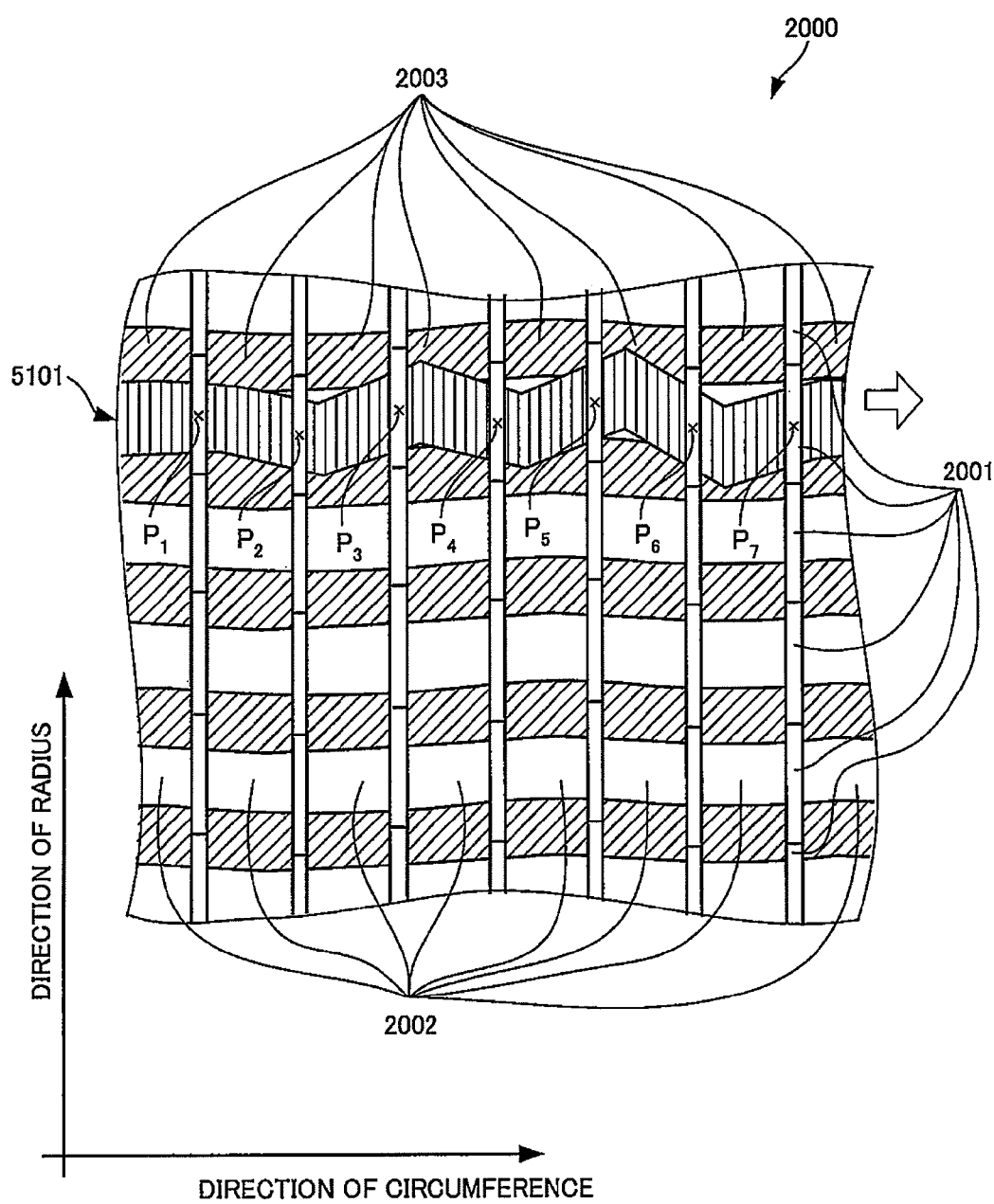
FIG. 2 is a diagram illustrating a magnetic disc where data regions undulate and there are positional shifts of position in servo regions.
Figure 5:
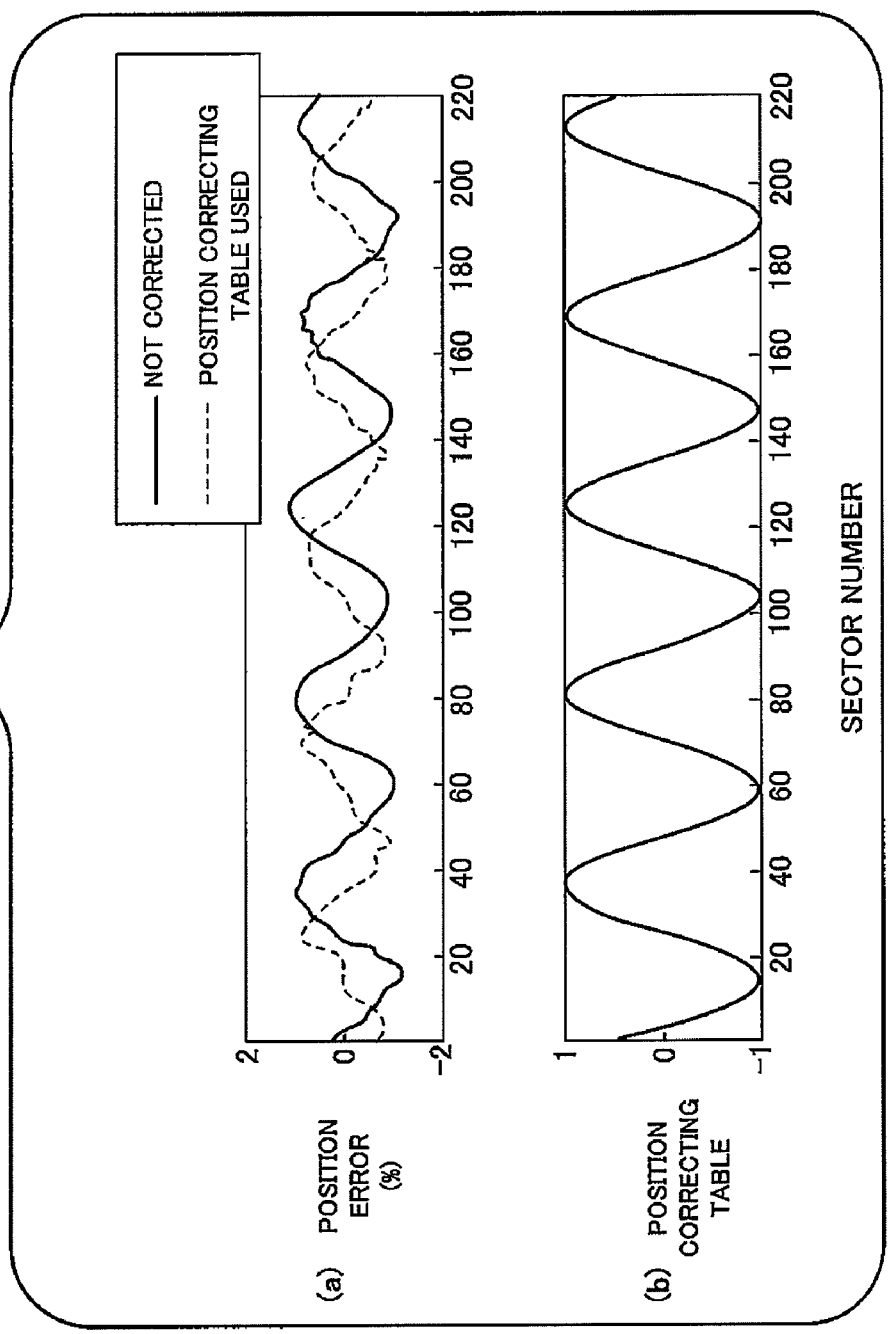
FIG. 5 is a diagram illustrating the effects of correcting the position using a position correcting table in the case where the difference h between the distance $r_s$ to the center position of the servo region and the distance $r_d$ to the center position of the data region fluctuates with a period of one fifth of the circumferential length of the track in that position.
Figure 6:
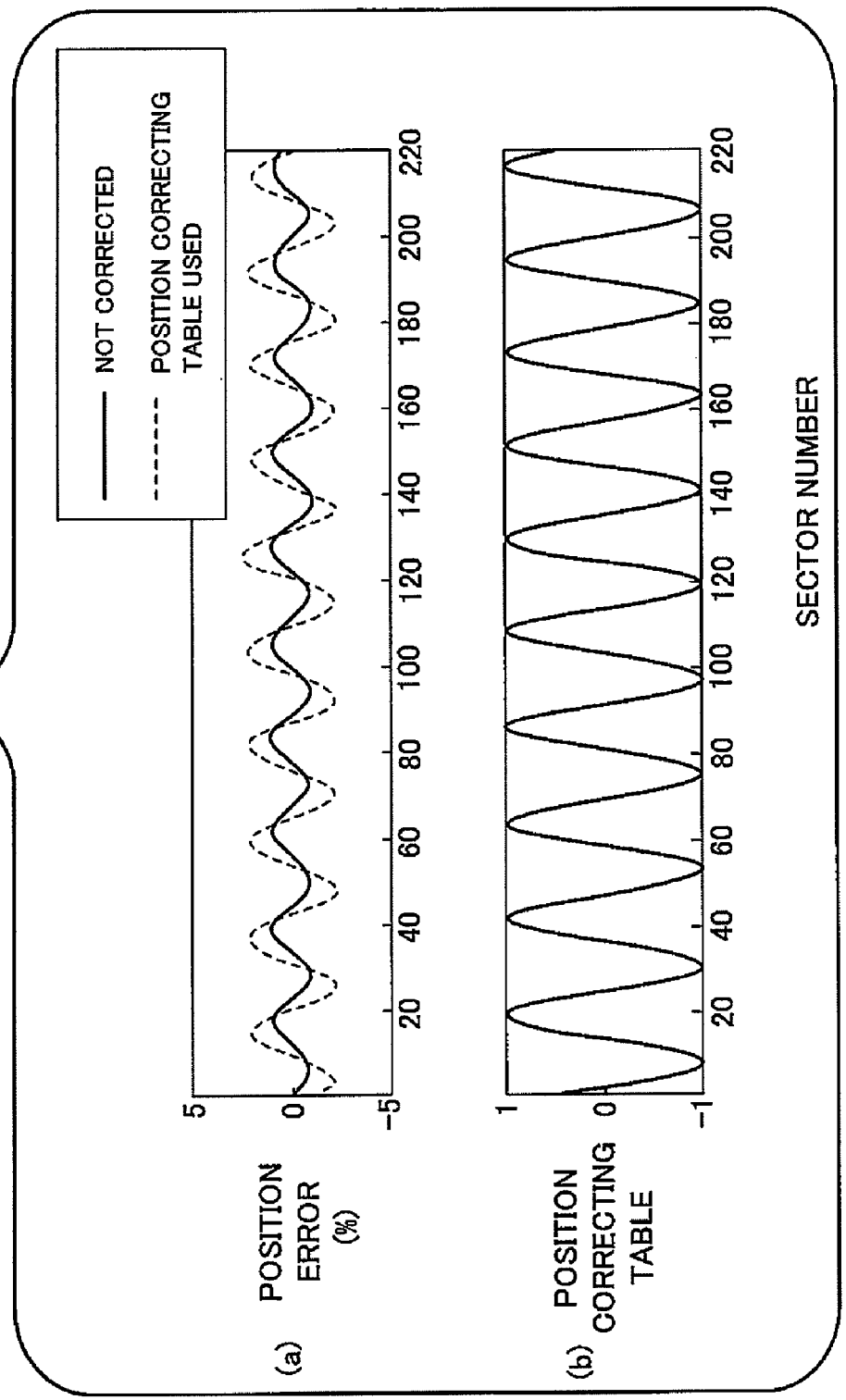
FIG. 6 is a diagram illustrating the effects of correcting the position using a position correcting table in the case where the difference h between the distance $r_s$ to the center position of the servo region 3001 and the distance $r_d$ to the center position of the data region fluctuates with a period of one tenth of the circumferential length of the track in that position.

For the sake of simplicity, FIGS. 5 and 6 illustrate the results of simulation in a magnetic disc when there are no shifts in the position between the center positions of the servo regions as in FIGS. 2 and 3, and only when the data regions undulate.

Part (a) of FIG. 13 and part (a) of FIG. 14 are graphs illustrating how the difference t (hereinafter referred to as position error t) between the distance y to the head position and the distance $r_d$ to the center position of the data region 3002 changes along the lateral axis indicating the sector number with respect to a magnetic disc 50 where 220 data regions 3002 are aligned per track in the direction of the circumference of the disc (that is, magnetic disc 50 where the number of sectors per track is 220). Here, the position error t is indicated by ratio (%) to the width of the track. Here, as described above, for the head 51, which is in the vicinity of the magnetic disc 50 rotating at a constant angular speed, sequential change of the sector in the vicinity of the head 51 (increase in the sector number) is proportional to the elapse of time, and thus, the lateral axis can be regarded as a substitution of the elapsed time. Part (a) of FIG. 13 and part (a) of FIG. 14 are graphs where the dark, solid lines (thicklines) indicate cases where the position and the control value are corrected using a position correcting table and a control value correcting table as in the control system in FIG. 12, and for the sake of comparison, dotted lines and solid lines respectively indicate cases where no control value is corrected and only the position is corrected using a position correcting table, and no control value or position is corrected.

The position correcting tables in part (b) of FIG. 13 and part (b) of FIG. 14 respectively correspond to graphs of the change in the difference h between the distance $r_s$ to the center position of the servo region 3001 and the distance $r_d$ to the center position of the data region 3002, and the position correcting value for each sector that forms the position correcting table is described with the ratio (%) relative to the width of the track as the unit.

Here, the dotted lines and the solid lines in the graphs in part (a) of FIG. 13 and part (a) of FIG. 14 are the same as the dotted lines and the solid lines in the graphs in part (a) of FIG. 5 and part (a) of FIG. 6, and the position correcting tables in part (b) of FIG. 13 and part (b) of FIG. 14 are the same as the position correcting tables in part (b) of FIG. 5 and part (b) of FIG. 6.

Part (c) of FIG. 13 and part (c) of FIG. 14 illustrate two types of control value correcting tables for each of the frequencies in the fluctuation of the difference h. These control value correcting tables are found from the formula (6), and as described above, the distance $r_s$ has a constant value in this simulation, and therefore, the second term on the right side $d_2 F(t)/dt_2$ is dropped, and these control value correcting tables are determined by the first term on the right side, $d^2(r_d - r_s)/dt^2$. That is, the control value correcting tables in part (c) of FIG. 13 and part (c) of FIG. 14 can be respectively obtained by multiplying the results obtained by differentiating the position correcting tables in part (b) of FIG. 13 and part (b) of FIG. 14 twice by a constant (wherein, a negative constant). Here, in part (c) of FIG. 13 and part (c) of FIG. 14, the unit of the longitudinal axis in the control value correcting tables is indicated as a dimensionless unit.

As illustrated in part (a) of FIG. 13 and part (a) of FIG. 14, thick lines in the graphs when the position is corrected and the control value is corrected using a position correcting table and a control value correcting table have amplitudes smaller than those of the dotted lines and the solid lines in the graphs in the case where only the position is corrected using a position correcting table without correcting the control value, or in the case where no control value or the position is corrected. It can be seen from this that the head 51 can be sufficiently prevented from oscillating largely and moving away from the center position by correcting the position and correcting the control value using a position correcting table and a control value correcting table, even in the case where there is fluctuations in high frequencies such that the difference h between the distance $r_s$ to the center position of the servo region 3001 and the distance $r_d$ to the center position of the data region 3002 fluctuates with a period of one fifth or one tenth of the circumferential length of the track.

Though in the above description the recording element 51b and the reproducing element 51a in the head 51 are located close to each other, and thus, the positions of the reproducing element 51a and the recording element 51b can be collectively regarded as the position of the head 51, an HDD having a magnetic head where the distance between the reproducing element and the recording element is approximately the width of the track, and this distance cannot be ignored from the point of view of the precision in positioning the head, and the control for positioning the head which is carried out in the HDD are described below. Such an HDD corresponds to another embodiment of the information storage device whose the basic mode (and the modified mode) is described above.

Constituent elements of this HDD largely differ from those of the HDD 500 in FIG. 7 in that the distance between the reproducing element and the recording element is approximately the width of the track in the head, and the position correcting information section and the control value correcting information section for the reproducing element (see FIG. 8) and the position correcting information section and the control value correcting information section for the recording element (see FIG. 8) are respectively provided in the correction information region (see the correction information region 3004 in FIG. 3) in the magnetic disc for correcting the effects of this distance, and except for these points, this HDD has the same constituent elements as the HDD 500 in FIG. 7. In addition, the operation of this HDD is the same as the operation of the HDD 500 in FIG. 7 except that the control for positioning the head is carried out such that the effects of the distance between the reproducing element and the recording element are corrected.

Thus, the following description focuses on the points where the HDD is different from the HDD 500 in FIG. 7.

Here, the magnetic disc provided in this HDD has the same configuration as the magnetic disc 3000 illustrated in FIG. 3 except that the contents of the correction information stored in the correction information region are different, and in the following, FIG. 3 is referred to for the specific arrangements of the data region, the servo region, the non-magnetic region and the correction information region, and the symbols of these are the same as the symbols used in FIG. 3.

First, it is specifically described that the distance between the reproducing element and the recording element is large, and this distance cannot be ignored from the point of view of the precision in the positioning of the head.

Figure 15A:
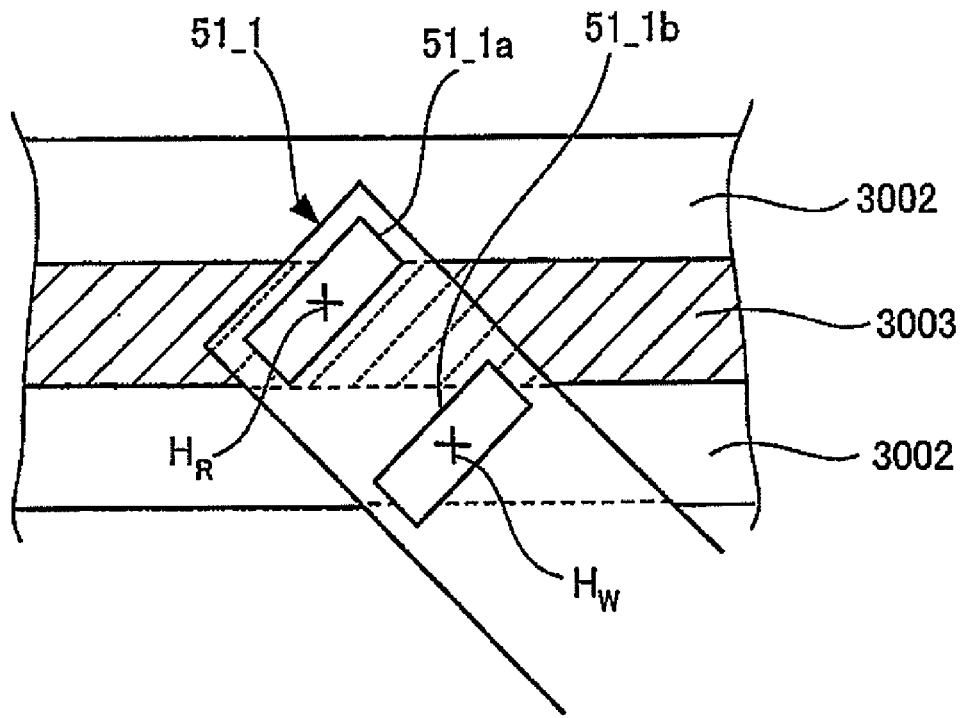
FIGS. 15A and 15B are diagrams illustrating the positional relationships between the reproducing element and the recording element in the head, where the distance between the reproducing element and the recording element is large.
Figure 15B:
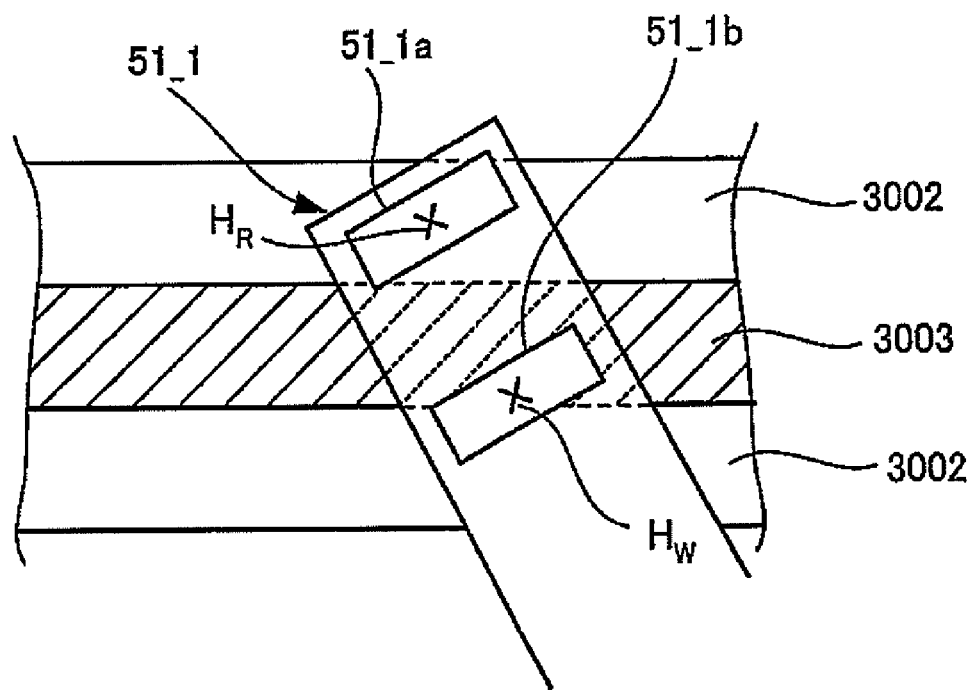

FIG. 15A and FIG. 15B are diagrams illustrating the positional relationships between the reproducing element 51_1a and the recording element 51_1b in the head 51_1 where the distance between the reproducing element 51_1a and the recording element 51_1b is large.

FIG. 15A illustrates how the head 51_1 appears when data is recorded, and FIG. 15B illustrates how the head 51_1 appears when data is reproduced. As illustrated in FIGS. 15A and 15B, the distance between the reproducing element 51_1a and the recording element 51_1b in the head 51_1 is approximately the width of the data region 3002 (the width of the track). Therefore, as illustrated in FIG. 15A, the reproducing element 51_1a deviates from the data region 3002 on the lower side and enters into the non-magnetic region 3003 or the data region 3002 on the upper side when the recording element 51_1b records data in the data region 3002 on the lower side in FIG. 15A, while as illustrated in FIG. 15B, the recording element 51_1b deviates from the data region 3002 on the upper side and enters into the non-magnetic region 3003 or the data region 3002 on the lower side when the reproducing element 51_1a reproduce data in the data region 3002 on the upper side in FIG. 15B.

Here, when data is reproduced, it is preferable for the control of the positioning of the head 51_1 to be carried out in such a manner that the center $H_R$ of the reproducing element 51_1a (hereinafter simply referred to as position of the reproducing element 51_1a) passes through the center position of the data region 3002, and when data is recorded, it is preferable for the control of the positioning of the head 51_1 to be carried out in such a manner that the center $H_W$ of the recording element 51_1b (hereinafter simply referred to as position of the recording element 51_1b) passes through the center position of the data region 3002.

Here, the position obtained through readout in the servo region 3001 corresponds to the position $H_R$ of the reproducing element 51_1a. Therefore, in order for the preferable positioning to be carried out when data is reproduced, control may be carried out so that the position obtained through readout comes to the center position of the data region 3002. This control can be carried out through substantially the same control in FIG. 12. The recording element 51_1b is not used when data is reproduced, and therefore, no specific problem arises with the precision in reproducing the data even in the head 51_1 where the position of the recording element 51_1b and the position of the reproducing element 51_1a are away from each other as in FIG. 15A.

In the case where the position of the recording element 51_1b is away from the position of the reproducing element 51_1a as in FIG. 15B when data is recorded, however, the position obtained through readout by the reproducing element 51_1a in the servo region 3001 (see FIG. 3) between recordings in the data region 3002 (see FIG. 3) cannot directly be regarded as the position of the recording element 51_1b, and thus, a problem arises with the precision in recording the data. In order for this head 51_1 to carry out such a preferable positioning control that the position of the recording element 51_1b passes through the center position of the data region 3002, it is necessary to carry out such control that the position obtained through readout in the servo region 3001 is converted to the position of the recording element 51 through calculation, and in addition, the position of this recording element 51 comes to the center position of the data region 3002.

In the following, how the preferable positioning control is carried out when data is recorded/reproduced will be described.

Figure 16:
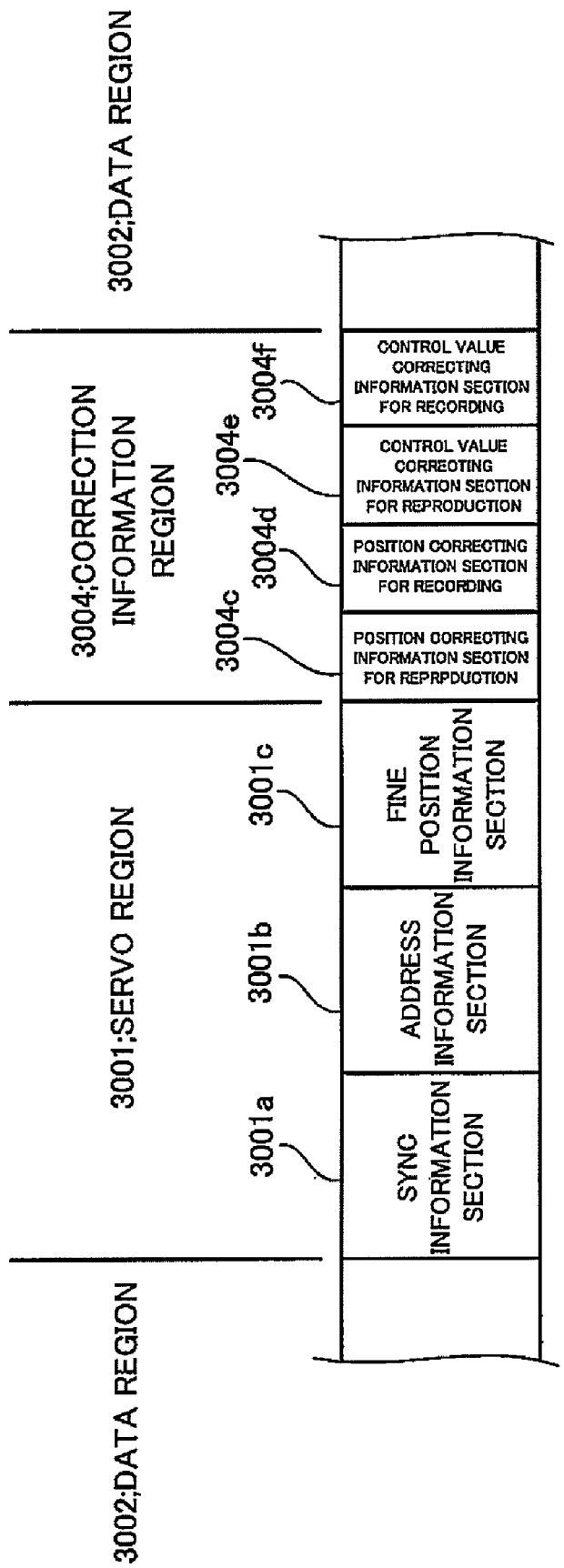
FIG. 16 is a diagram illustrating the configuration of the servo region and the correction information region in the magnetic disc of an HDD where the distance between the reproducing element and the recording element is large.

FIG. 16 is a diagram illustrating the configuration of the servo region 3001 and the correction information region 3004 in the magnetic disc in an HDD where the distance between the reproducing element 51_1a and the recording element 51_1b is large.

As illustrated in FIG. 16, the magnetic disc in this HDD is provided with a configuration where a data region 3002, a servo region 3001 and a correction information region 3004 are aligned in sequence. The configuration of the servo region 3001 is the same as the configuration of the servo region 3001 described in FIG. 8, and the same descriptions are not repeated here.

The correction information region 3004 in FIG. 16 is provided with a position correcting information section 3004c for reproduction where the position correcting information which indicates the amount of position shift between the center position of the data region 3002, which is adjacent to the correction information region, and the center position of the servo region 3001, which is adjacent to the correction information region 3004, is recorded as the position correcting information section for the reproducing element 51_1a. In addition, the correction information region 3004 is also provided with a control value correcting information section 3004e for reproduction where control value correcting information which indicates the logical control value (logical control value) to be supplied to the voice coil motor 54 in order to make the position of the reproducing element 51_1a coincide with the center position of the data region 3002 is recorded as the control value correcting information section for the reproducing element 51_1a. The position correcting information section 3004c for reproduction and the control value correcting information section 3004e for reproduction are the same as the position correcting information section 3004a and the control value correcting information section 3004b which are described in the above in reference to FIG. 8.

In addition, the correction information region 3004 in FIG. 16 is provided with a position correcting information section 3004d for recording as the correction information section for the recording element 51_1a, and a control value correcting information section 3004f for recording is also provided as the control value correcting information section for the recording element 51_1a. The amount of position shift in the sector to which the recording element 51_1b comes close in the case where the reproducing element 51_1a is in the vicinity of the sector in this correction information region 3004 is recorded in the position correcting information section 3004d for recording. In addition, a logical control value, which is required for the position of the recording element 51_1b, to coincide with the center position of the data region 3002 of a sector in the sector to which the recording element 51_1b come close in the case where the reproducing element 51_1a is in the vicinity of the sector in this correction information region 3004 is recorded in the control value correcting information section 3004f for recording.

Figure 17A:
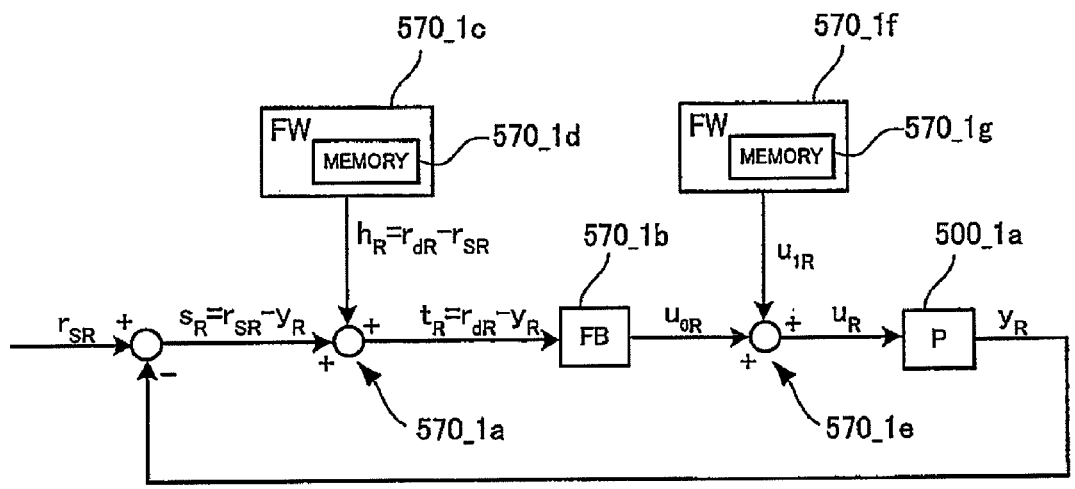
FIGS. 17A and 17B are block diagrams illustrating control for positioning the head by the MPU of an HDD where the distance between the reproducing element and the recording element is large.
Figure 17B:
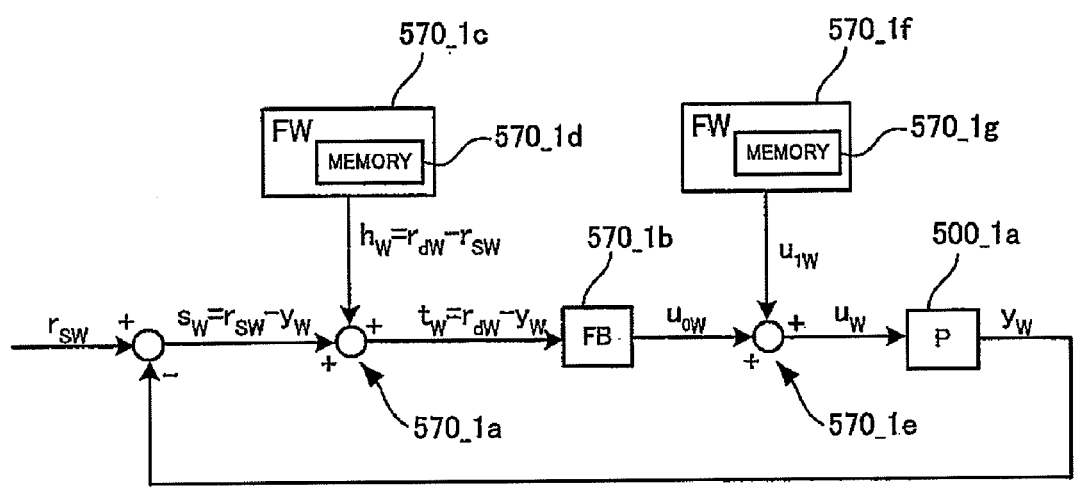

FIG. 17A and FIG. 17B are control block diagrams illustrating the control of positioning the head 51 by the MPU in an HDD where the distance between the reproducing element 51_1a and the recording element 51_1b is large.

FIG. 17A is a control block diagram at the time when the reproducing element 51_1a is positioned, and FIG. 17B is a control block diagram when the recording element 51_1b is positioned.

The control blocks illustrated in FIGS. 17A and 17B have a first feed forward (FW) control section 570_1c, a second feed forward (FW) control section 570_1f, a feedback (FB) control section 570_1b, a first correction adder 570_1a and a second correction adder 570_1e, and they respectively correspond to the operation of the MPU in this HDD.

The first memory 570_1d in the first feed forward (FW) control section 570_1c is provided with a position correcting table for positioning the reproducing element 51_1a (position correcting table for reproduction) which indicates the amount of position shift between the center position of the data region 3002, which is adjacent to the correction information region 3004 in FIG. 16, and the center position of the servo region 3001, which is adjacent to the correction information region 3004, by associating the amount of position shift with the sector in the data region 3002. This position correcting table for reproduction is the same as the position correcting table in FIG. 12 and is used for the positioning of the reproducing element 51_1a when data is reproduced. Furthermore, the first memory 570_1d in this first feed forward (FW) control section 570_1c is provided with a position correcting table (position correcting table for recording) which is used to position the recording element 51_1b when data is recorded. This position correcting table for recording is a table which indicates the amount of position shift between the center position of the data region 3002, which is adjacent to the correction information region 3004 in FIG. 16, and the center position of the servo region 3001, which is adjacent to the correction information region 3004, by associating the amount of position shift with the sector to which the reproducing element 51_1a comes close in the case where the recording element 51_1b is in the vicinity of the sector in this data region 3002. Accordingly, this position correcting table for recording is a table where the corresponding sector in the position correcting table for reproduction is replaced with the sector in a position at a distance by the amount of position shift between the reproducing element 51_1a and the recording element 51_1b.

The second memory 570_1g in the second feed forward (FW) control section 570_1f is provided with a control value correcting table for positioning the reproducing element 51_1a (control value correcting table for reproduction) which indicates the logical control value (logical control value) to be supplied to the voice coil motor in order to move the reproducing element 51_1a to the center position of the data region 3002 by associating the logical control value with the sector in this data region 3002. This control value correcting table for reproduction is the same as the control value correcting table described above in reference to FIG. 12 and is used for the positioning of the reproducing element 51_1a when data is reproduced. Furthermore, the second memory 570_1g in this second feed forward (FW) control section 570_1f is provided with a control value correcting table used for positioning the recording element 51_1b when data is recorded (control value correcting table for recording). This control value correcting table for recording is a table which indicates the logical control value (logical control value) to be supplied to the voice coil motor in order to move the recording element 51_1a to the center position of the data region 3002 by associating the logical control value with the sector to which the reproducing element 51_1a comes close in the case where the recording element 51_1b is in the vicinity of the sector of this data region 3002.

The position correcting table for reproduction, the position correcting table for recording, the control value correcting table for reproduction and the control value correcting table for recording are created by associating the amount of position shift for the reproducing element 51_1a, the amount of position shift for the recording element 51_1b, the logical control value for the reproducing element 51_1a and the logical control value for the recording element 51_1b, which are obtained through readout in the position correcting information section 3004c for reproduction, the position correcting information section 3004d for recording, the control value correcting information section 3004e for reproduction and the control value correcting information section 3004f for recording in the correction information region 3004 in FIG. 16, with the sector in this correction information region 3004 when the magnetic disc in this HDD is incorporated into the HDD (substantially the same as associating with the data region 3002 adjacent to the correction information region 3004). Here, though the two first memories 570_1d and 570_1g appear to be different from each other in the control block in FIG. 12, they are the same memory as the hardware in the MPU in this HDD.

Next, the control of positioning the head 51_1 when data is reproduced and the control of positioning the head 51_1 when data is recorded are described.

First, the control of positioning of the head 51_1 when data is reproduced is described in reference to FIG. 17A. As illustrated in FIG. 17A, the difference $s_R(s_R=r_{SR}-y_R)$ between the distance $y_R$ between the center of the magnetic disc and the position of the reproducing element 51_1a at that time and the distance $r_{SR}$ between the center of the magnetic disc and the center position of the servo region 3001 can be obtained through readout in the servo region 3001 (see FIG. 3). Next, the first feed forward (FW) control section 570_1c uses the position correcting table for reproduction which is stored in the first memory 570_1d in the first feed forward control section 570_1c so as to find the difference $h_R(h_R=r_dR-r_{SR})$ between the distance $r_{SR}$ between the center of the magnetic disc and the center position of this servo region 3001 and the distance $r_{dR}$ between the center of the magnetic disc and the center position of the data region 3002 which face this servo region 3001 with the correction information region 3004 in between and transfers the difference to the first correction adder 570_1a. The first correction adder 570_1a, using the position correcting table for reproducing stored in the first memory 570_1d in the first feed forward control section 570_1c describe above, adds the transferred difference $h_R$ to the difference $s_R$ between the distance $y_R$ to the position of the reproducing element 51_1a and the distance $r_{SR}$ to the center position of the servo region 3001 so as to find the difference $t_R(t_R=s_R+h_R=r_{dR}-y_R)$ between the distance $y_R$ to the position of the reproducing element 51_1a and the distance $r_{dR}$ to the center position of the data region 3002. Next, the feedback (FB) control section 570_1b finds the feedback control value $u_{OR}$ for the feedback control which makes this difference $t_R$ zero. Next, the second feed forward (FW) control section 570_1f uses the control value correcting table for reproduction stored in the second memory 570_1g in the second feed forward control section 570_1f described above so as to find the logical control value $u_{1R}$ associated with this sector (set of the servo region 3001, the correction information region 3004 and the data region 3002) and transfers this logical control value $u_{1R}$ to the second correction adder 570_1a. Here, the logical control value $u_{1R}$ is determined by the formulas (1) to (6) in the same manner as described above in reference to FIG. 12. Specifically, $u_{1R}$ is determined by the following formula where $(r_d-r_s)$ in the formula (6) is replaced with the $h_R$ ($h_R=r_{dR}-r_{SR}$) in the same manner as in the formulas (1) to (6), and F(t) in the formula (6) is replaced with $(r_{SR}-y_{OR})$.

$$u_{1R}=(1/k) \times [d^2h_R/dt^2+d^2(r_{SR}-y_{OR})/dt^2] \qquad (8)$$

Wherein, $y_{OR}$ is a mean radius of a track close to reproduction element 51_1a.

Upon the reception of the logical control value $u_{1R}$ from the second feed forward (FW) control section 570_1f, the second correction adder 570_1e adds this logical control value $u_{1R}$ to the feedback control value $u_{OR}$ so as to find a performing control value $u_R$ made up of the sum of the logical control value $u_{1R}$ and the feedback control value $u_{OR}$. Then, the second correction adder 570_1e inputs this actual control value $u_R$ into the voice coil motor so as to control the voice coil motor. As described above, the voice coil motor is controlled, and thus, the reproducing element 51_1a moves to the position which is away from by a distance $y_R$ from the center of the disc. This figure illustrates the voice coil motor and the head 51_1 collectively as the plant 500_1a, and the plant 500_1a outputs the distance $y_R$ when the performing control value $u_R$ is inputted in accordance with the flow of control when data is reproduced. After the reproducing element 51_1a is moved, a new difference $s_R$ between a new distance $y_R$ to the position of the reproducing element 51_1a and a new distance $r_{SR}$ to the center position of the servo region 3001 is obtained through readout in the servo region 3001 to which the reproducing element moves, and the same control as described above is carried out on the basis of this difference. When this control is repeated, the position of the reproducing element 51_1a comes closer to the center position of the data region 3002 as time elapses.

Next, the control of the positioning of the head 51_1 when data is recorded is described in reference to FIG. 17B. The difference $s_W(s_W=r_{SW}-y_W)$ between the distance $y_W$ between the center of the magnetic disc and the position of the recording element 51_1b at that time and the distance $r_{SW}$ to the center position of the servo region 3001 of the sector in the vicinity of the recording element 51_1b at that time is based on the position of the reproducing element 51_1a at that time (position obtained by the reproducing element 51_1a reading out the position information when the recording element 51_1b is in the vicinity of the sector) and determined uniquely. Specifically, when the reproducing element 51_1a is at a coordinate point $x_R$ on the magnetic disc (wherein, $x_R$ is a vector), the coordinate point $x_W$, which is the position of the recording element 51_1b (wherein, $x_W$ is a vector), can be expressed as follows using a vector W ($x_R$) which extends from the position of the reproducing element 51_1a to the position of the recording element 51_1b.

$$x_W=x_R+W(x_R) \qquad (9)$$

The distance $y_W$ to the position of the recording element 51_1b at that time is determined using the formula (9). Here, the vector W ($x_R$) is a vector which is geometrically found from the positional relationship between the recording element 51_1b and the reproducing element 51_1a illustrated in FIG. 15A AND FIG. 15B and a vector of which direction changes in accordance with $x_R$. In practice, $x_R$ is a discrete coordinate point which is determined by the address (track number and sector number) and the fine position of the reproducing element 51a with the center position of the servo region 3001 as the reference (information recorded in the fine position information section 3001c in FIG. 12). In addition, the sector to which the recording element 51_1b is close at that time is determined by the formula (9), and the distance $r_{SW}$ to the center position of the servo region 3001 of this sector is also determined. As a result, the difference $s_W$ ($s_W=r_{SW}-y_W$) between the distance $y_W$ between the center of the magnetic disc and the position of the recording element 51_1b at that time and the distance $r_{SW}$ to the center position of the servo region 3001 of the sector to which the recording element 51_1b is close at that time is determined on the basis of the position of the reproducing element 51_1a at that point in time. This operation is carried out by the MPU, and the operation of the MPU which carries out this operation is included in the plant 500_1a in FIG. 17B.

Next, the first feed forward (FW) control section 570_1c finds the difference $h_W$ ($h_W=r_{dW}-r_{SW}$) between the distance $r_{SW}$ between the center of the magnetic disc and the center position of the servo region 3001 of the sector and the distance $r_{dW}$ between the center of the magnetic disc and the center position of the data region 3002, which faces the servo region 3001 with the correction information region 3004 in between, for the sector to which the recording element 51_1b is close at that time and transfers the difference to the first correction adder 570_1a. Specifically, this difference $h_{AW}$ is found by the first feed forward (FW) control section 570_1c reading out the difference $h_W$ associated with the sector in the vicinity of the reproducing element 51_1a from the position correcting table for recording. Here, the difference $h_W$ in the sector to which the recording element 51_1b is close is represented by the following formula in the case where the difference $h_R$ in FIG. 17A is represented by the formula $h_R=h_R(x)$ as a function of an arbitrary coordinate point x (wherein, x is a vector) on the magnetic disc.

$$h_W=h_R(x_R+W(x_R)) \quad (10)$$

Here, $x_R$ is a coordinate point $x_R$ (wherein, $x_R$ is a vector) of the reproducing element 51_1a when the recording element 51_1b is close to the sector, and $W(x_R)$ is a vector directed to the position of the recording element 51_1b from the position of the reproducing element 51_1a (position of coordinate point $x_R$). In addition, $h_R(x)$ is a function where one value is determined in accordance with the sector, and $h_R(x)$ is a constant value within one sector (that is, x is at whichever coordinate point within the sector). By using the formula (10) in this manner, the difference $h_W$ in FIG. 17A (which is equivalent to the position correcting table for recording) can be found from the difference $h_R$ in FIG. 17A (which is equivalent to the position correcting table for reproduction).

The first correcting adder 570_1a adds the difference $h_W$ that has been transferred to the difference $s_W$ between the distance $y_W$ to the position of the recording element 51_1b and the distance $r_{SW}$ to the center position of the servo region 3001 so as to find the difference $t_W$ ($t_W=s_W+h_W=r_{dW}-y_W$) between the distance $y_W$ to the position of the recording element 51_1b and the distance $r_{dW}$ to the center position of the data region 3002. Next, the feedback (FB) control section 570_1b finds the feedback control value $u_{OW}$ for the feedback control which makes this difference $t_W$ zero. Next, the second feed forward (FW) control section 570_1f finds the logical control value $u_{1W}$ to be supplied to the voice coil motor in order to move the recording element 51_1a to the center position of the data region 3002 and transfers this logical control value $u_{1W}$ to the second correction adder 570_1a. Specifically, this logical control value $u_{1W}$ is found by the second feed forward (FW) control section 570_1f reading out the logical control value $u_{1W}$ associated with the sector to which the reproducing element 51_1a is close at that time from the control value correcting table for recording. Here, specifically, the logical control value $u_{1W}$ is determined by the following formula where $(r_d-r_s)$ in the formula (6) is replaced with the $h_W$ ($h_W=r_{dW}-r_{SW}$) and F (t) in the formula (6) is replaced with ($r_{SW}-y_{OW}$) in the same manner as in the formulas (1) to (6).

$$u_{1W}=(1/k)\times[d^2h_W/dt^2+d^2(r_{SW}-y_{OW})/dt^2] \quad (11)$$

Here, $y_{OW}$ is an average radius of the track to which the recording element 51_1b is close.

Upon the receipt of the logical control value $u_{1W}$ from the second feed forward (FW) control section 570_1f, the second correction adder 570_1e adds this logical control value $u_{1W}$ to the feedback control value $u_{OW}$ so as to find the performing control value $u_W$, which is made up of the sum of the logical control value $u_{1W}$ and the feedback control value $u_{OW}$. In addition, the second correction adder 570_1e inputs this actual control value $u_W$ into the voice coil motor so as to control the voice coil motor. In this manner, the voice coil manner is controlled, and thus, the recording element 51_1b moves to the position which is away from the center of the disc by the distance $y_W$. In this figure, the voice coil motor and the head 51_1 are collectively illustrated as the plant 500_1a, and when the performing control value $u_W$ is inputted, the plant 500_1a outputs the distance $y_W$ in the flow of the control when the data is reproduced. Here, as described above in FIG. 17B, the plant 500_1a includes the operation of the MPU for finding the coordinate point $x_W$ of the recording element 51_1b from the coordinate point $x_R$ of the reproducing element 51_1a using the formula (8).

After the recording element 51_1b moves, a new difference $s_W$ between a new distance $y_W$ to the position of the recording element 51_1b and a new distance $r_{SW}$ to the center position of the servo region 3001 is obtained on the basis of the readout in the servo region 3001 by the reproducing element 51_1a. In addition, the same control as described above is carried out on the basis of this difference. When this control is repeated, the position of the recording element 51_1b comes closer to the center position of the data region 3002 as time elapses.

In the above control system in FIG. 17A AND FIG. 17B, the effects of the distance between the recording element 51_1b and the reproducing element 51_1a are corrected as described above. In this control system also, the voice coil motor 54 is controlled by the performing control value u which is obtained by adding the logical control value $u_{1R}$ and the logical control value $u_{1W}$ to the feedback control value $u_{OR}$ and the feedback control value $u_{OW}$, and thus, the recording element 51_1b and the reproducing element 51_1a can move promptly towards the center position of the data region 3002 in comparison with the control system in FIG. 4. As a result, excellent recording/reproduction of information can be achieved even in a magnetic disc 3000 where the distance between the position of the servo region 3001 and the position of the data region 3002 fluctuates at high frequency in the direction of the radius of the magnetic disc.

In the above description, the feedback control section 570_1b in FIG. 17A AND FIG. 17B, the first correction adding section 570_1a and the first feed forward control section 570_1c together correspond to an example of the feedback control value determining section in the basic mode of the information storage device. In addition, the second feed forward controlling section 570_1f and the second correction adding section 570_1a for finding the performing control value $u_{1R}$ and the performing control value $u_{1W}$ by adding the logical control value $u_{1R}$ and the logical control value $u_{1W}$ to the feedback control value $u_{OR}$ and the feedback control value $u_{OW}$ collectively correspond to an example of the performing control value determining section in the basic mode of the information storage device. In addition, the second correction adding section 570_1a for controlling the voice coil motor by inputting the performing control value $u_{1R}$ and the performing control value $u_{1W}$ into the voice coil motor corresponds to an example of the actual control section in the basic mode of the information storage device.

Here, the results of specific simulation are used to describe that the recording element 51_1b and the reproducing element 51_1a can be prevented from largely oscillating and moving away from the center position by adopting the control system in FIG. 17A AND FIG. 17B.

Figure 18:
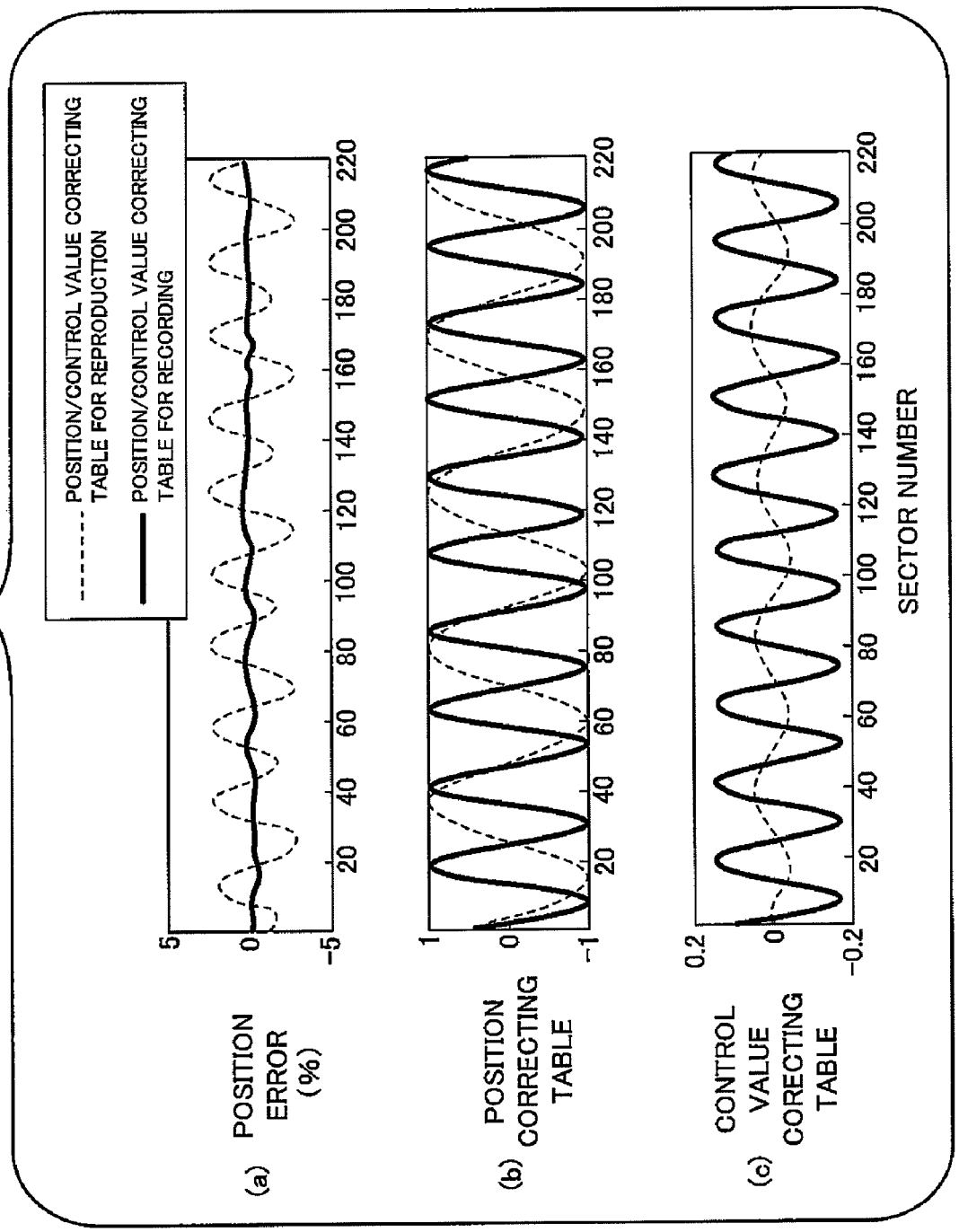
FIG. 18 is a diagram illustrating the effects of positioning the head in accordance with the track in the vicinity of a recording element using the position for recording and a control value correcting table when data is recorded in the case where the difference $h_R$ between the distance $r_{SR}$ to the center position of the servo region and the distance $r_{dR}$ to the center position of the data region 3002 fluctuates with a period of one fifth of the circumferential length of the track in that position in the track close to the reproducing element, and where the difference $h_W$ between the distance $r_{SW}$ to the center position of the servo region and the distance $r_{dW}$ to the center position of the data region fluctuates with a period of one tenth of the circumferential length of the track in that position in the track close to the recording element.

FIG. 18 is a diagram illustrating the effects of the positioning of the head in accordance with the track in the vicinity of the recording element 51_1b using the position/control value correcting table for recording when the data is recorded in the case where the difference $h_R$ between the distance $r_{SR}$ to the center position of the servo region 3001 and the distance $r_{dR}$ to the center position of the data region 3002 fluctuates with a period of one fifth of the circumferential length of the track in this portion in the track in the vicinity of the reproducing element 51_1a and the difference $h_W$ between the distance $r_{SW}$ to the center position of the servo region 3001, and the distance $r_{dW}$ to the center position of the data region 3002 fluctuates with a period of one tenth of the circumferential length of the track in this portion in the track in the vicinity of the recording element 51_1b.

For the sake of simplicity, FIG. 18 illustrates the results of simulation in a case where there is no shift of position between the center positions of the servo regions as in FIGS. 2 and 3, and only the data regions undulate in a track of the magnetic disc.

Part (a) of FIG. 18 is a graph illustrating the change in the difference $t_W$ between the distance $y_W$ to the position of the recording element 51_1b and the distance $r_{dW}$ to the center position of the data region 3002 (hereinafter referred to as position error $t_W$) with the sector number taken along the lateral axis in the magnetic disc 50 where 220 data regions 3002 per track are aligned in the direction of the circumference of the disc (that is, in magnetic disc 50 where the number of sectors per track is 220). Here, the position error t is represented by the ratio (%) relative to the width of the track. In this simulation, the magnetic disc rotates at a constant angular speed, and for the reproducing element 51_1a and the recording element 51_1b in the vicinity of the magnetic disc which rotates at a constant angular speed as described above, sequential change of the sector in the vicinity of the reproducing element 51_1a and the recording element 51_1b (increase in the sector number) is proportional to the elapsed time. Therefore, the lateral axis can be regarded as the substitution of the elapsed time.

Part (a) of FIG. 18 is a graph illustrating with a dark, solid line (thick line) the case where the head is positioned in accordance with the track in the vicinity of the recording element 51_1b (that is, the track where the difference $h_W$ fluctuates with the period of one tenth of the circumferential length of the track in this portion) by using the position/control value correcting table for recording when data is recorded, as in the control system in FIG. 17B. Here, part (a) of FIG. 18 is a graph illustrating with a dotted line a case where the head is positioned in accordance with the track in the vicinity of the reproducing element 51_1a by using the position/control value correcting table for reproduction when data is recorded (that is, the track where the difference $h_R$ fluctuates with the period of one fifth of the circumferential length of the track in this portion) for the sake of comparison.

Part (b) of FIG. 18 illustrates with a dark, solid line (thick line) a position correcting table for recording which corresponds to the track in the vicinity of the recording element 51_1b (to be precise, the portion of the position correcting table for recording associated with this track) and illustrates with a dotted line a position correcting table for reproduction which corresponds to the track in the vicinity of the reproducing element 51_1a (to be precise, the portion of the position correcting table for reproduction which corresponds to this track). These position correcting tables correspond to the graphs illustrating the change in the respective differences $h_W$ and $h_R$ between the distance $r_{SW}$ and $r_{SR}$ to the center position of the servo region 3001 and the distance $r_{dW}$ and $r_{dR}$ to the center position of the data region 3002, and the position correcting value for each sector that forms the position correction table is described with the ratio (%) relative to the width of the track as the unit.

In addition, part (c) of FIG. 18 illustrates with a dark, solid line (thick line) a control value correcting table for recording associated with the track in the vicinity of the recording element 51_1b and illustrates with a dotted line a control value correcting table for reproduction associated with the track in the vicinity of the reproducing element 51_1a (to be precise, the portion of the control value correcting table for reproduction associated with this track). These control value correcting tables can be found from the formulas (8) and (11), and as described above, the distance $r_{SR}$ and $r_{SW}$ have constant values in this simulation, and therefore, the second term on the right side $d^2(r_{SR}-y_{OR})/dt^2$ in the formula (8) is eliminated and the second term on the right side $d^2(r_{SW}-y_{OW})/dt^2$ in the formula (11) is eliminated. As a result, the control value correcting table for reproduction in part (c) of FIG. 18 is determined by the first term on the right side, $d^2h_R/dt^2$ in the formula (8) and the control value correcting table for recording in part (c) of FIG. 18 is determined by the first term on the right side, $d^2h_W/dt^2$ in the formula (11). That is, the control value correcting table in part (c) of FIG. 18 can be obtained by differentiating the position correcting table in part (b) of FIG. 18 twice and multiplying the result by a constant (wherein, a negative constant). Here, part (c) of FIG. 18 illustrates the unit for the longitudinal axis of the control value correcting table as a dimensionless unit.

As illustrated in part (a) of FIG. 18, the graph with a thick line for positioning the head in accordance with the track in the vicinity of the recording element 51_1b (that is, the track where the difference $h_W$ fluctuates with a period of one tenth of the circumferential length of the track in this portion) using a position/control value correcting table for recording has a smaller amplitude than that of the graph with a dotted line for positioning the head in accordance with the track in the vicinity of the reproducing element 51_1a (that is, the track where the difference $h_R$ fluctuates with a period of one fifth of the circumferential length of the track in this portion). It can be seen from this that it is preferable to position the head in accordance with the track in the vicinity of the recording element 51_1b when data is recorded in order to precisely record data.

The above is descriptions of the embodiments.

Though in the above descriptions, the positions and the control values are corrected using position correcting tables and a control value correcting tables, tables obtained by applying filtering to these tables so that high frequency components are removed in order to stabilize the tracking properties of feedback control may be used in a case where positional shifts caused by very high frequencies in the basic mode of the information storage device described above.

In addition, in the basic mode of the information storage device, a data region formed entirely of a magnetic material may be used as the data region in the magnetic disc, or a data region having unit regions in dots formed of a magnetic material and aligned in the direction of the circumference of the magnetic disc may be used.

As described above, in the basic mode for information storage devices, the position of the head can sufficiently be prevented from fluctuating relative to the target position, and information can be recorded/reproduced in an appropriate manner.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. An information storage device, where an information storage medium in a form of a disc in which information is stored is rotated, and a head is moved above the rotating information storage medium in order to access information, comprising:
   a drive section that moves the head above the information storage medium; and
   a control section that controls the drive section, wherein
   the information storage medium is formed such that a plurality of tracks in stripe-shape that extend in the direction of the circumference of the information storage medium and circle around a center of the disc of the information storage medium are aligned in the direction of the radius of the information storage medium, and each of the plurality of tracks is formed such that a first region and a second region repeat alternately, the first region is a region for user information to be written in and to be read from and extend in stripe-shape in the direction of the circumference and the second region stores information for positioning the head, and
   the control section comprises:
   a feedback control value determining section that finds a difference between a position of the head in the direction of the radius which is obtained through reading by the head in the second region and a representative position of the first region as an object for accessing in the direction of the radius and that determines a feedback control value for feedback control to eliminate the difference;
   a control performing value determining section that has a table where the first region is associated with a logic control value, the control value being logically required to move the head to the representative position in the first region, finds the logic control value associated with the first region for which the feedback control value is determined by the feedback control value determining section using the table, and determines a control performing value for performing control by adding the feedback control value determined by the feedback control value determining section to the logic control value; and
   a control performing section that performs control over the drive section on the basis of the control performing value determined by the control performing value determining section.

2. The information storage device according to claim 1, wherein
   in the information storage medium, logic control value information that represents the logic control value for moving the head to the representative position in the first region is recorded in the second region, and
   the table is created by reading with the head the logic control value information recorded in the second region of the information storage medium.

3. The information storage device according to claim 1, wherein
   the head comprises a reading element which reads information in the information storage medium and a recording element which records information in the information storage medium,
   the feedback control value determining section, at the time of reading, determines the feedback control value by finding a difference between a position of the reading element in the direction of the radius which position is obtained through reading by the reading element in the second region and the representative position of the first region as an object for accessing, and at the time of recording, finds a position of the recording element from the position of the reading element in the direction of the radius which is obtained through reading by the reading element in the second region on the basis of a relative positional relationship between the reading element and the recording element in the head, to determine the feedback control value by finding a difference between the position of the recording element and the representative position of the first region as the object for accessing, and
   the control value correcting section comprises two tables as the table: a table for reading where the first region is associated with the logic control value which is a control value logically required to move to the reading element to the representative position in the first region, and a table for recording where the first region is associated with the logic control value which is a control value logically required to move the recording element to the representative position in the first region, and determines, at the time of reading, the control performing value using the table for reading and determines, at the time of recording, the control performing value using the table for recording.

4. The information storage device according to claim 3, wherein
   in the information storage medium, information on a control value for reading which represents the logic control value for moving the reading element to the representative position in the first region and information on a control value for recording which represents the logic control value for moving the recording element to the representative position in the first region are recorded in the second region, and
   the table for reading and the table for recording are created by reading the information on the control value for reading and the information on the control value for recording which are recorded in the second region of the information storage medium.

5. The information storage device according to claim 1, wherein in the information recording medium, information on a scale indicating a distance from the center position of the second region in the direction of the radius is recorded in the second region.

6. The information storage device according to claim 2, wherein in the information recording medium, information on a scale indicating a distance from the center position of the second region in the direction of the radius is recorded in the second region.

7. The information storage device according to claim 3, wherein in the information recording medium, information on a scale indicating a distance from the center position of the second region in the direction of the radius is recorded in the second region.

8. The information storage device according to claim 4, wherein in the information recording medium, information on a scale indicating a distance from the center position of the second region in the direction of the radius is recorded in the second region.

9. The information storage device according to claim 5, wherein in the information recording medium, position correcting information indicating an amount of a position shift with respect to the radius direction between the center position of the second region and the representative position of the first region adjacent to the second region is recorded in the second region.

10. The information storage device according to claim 6, wherein in the information recording medium, position correcting information indicating an amount of a position shift with respect to the radius direction between the center position of the second region and the representative position of the first region adjacent to the second region is recorded in the second region.

11. The information storage device according to claim 7, wherein in the information recording medium, position correcting information indicating an amount of a position shift with respect to the radius direction between the center position of the second region and the representative position of the first region adjacent to the second region is recorded in the second region.

12. The information storage device according to claim 8, wherein in the information recording medium, position correcting information indicating an amount of a position shift with respect to the radius direction between the center position of the second region and the representative position of the first region adjacent to the second region is recorded in the second region.

* * * * *